United States Patent
Zheng et al.

(10) Patent No.: US 9,696,567 B2
(45) Date of Patent: Jul. 4, 2017

(54) INTERDIGITATED OPTICAL MODULATOR

(71) Applicant: Futurewei Technologies, Inc., Plano, TX (US)

(72) Inventors: Dawei Zheng, Irvine, CA (US); Hongbing Lei, San Jose, CA (US); Qianfan Xu, San Jose, CA (US); Xiao Shen, San Bruno, CA (US); Yusheng Bai, Los Altos Hills, CA (US)

(73) Assignee: Futurewei Technologies, Inc., Plano, TX (US)

( * ) Notice: Subject to any disclaimer, the term of this patent is extended or adjusted under 35 U.S.C. 154(b) by 166 days.

(21) Appl. No.: 14/605,744

(22) Filed: Jan. 26, 2015

(65) Prior Publication Data

US 2015/0212346 A1 Jul. 30, 2015

Related U.S. Application Data

(60) Provisional application No. 61/932,857, filed on Jan. 29, 2014.

(51) Int. Cl.
| | | |
|---|---|---|
| *G02F 1/025* | (2006.01) | |
| *H04B 10/54* | (2013.01) | |
| *B82Y 20/00* | (2011.01) | |
| *G02F 1/015* | (2006.01) | |

(52) U.S. Cl.
CPC .............. *G02F 1/025* (2013.01); *H04B 10/54* (2013.01); *B82Y 20/00* (2013.01); *G02F 2001/0151* (2013.01); *Y10S 977/834* (2013.01)

(58) Field of Classification Search
None
See application file for complete search history.

(56) References Cited

U.S. PATENT DOCUMENTS

| | | |
|---|---|---|
| 5,343,324 A | 8/1994 | Le et al. |
| 6,845,198 B2 | 1/2005 | Montgomery et al. |
| 7,065,301 B2 | 6/2006 | Shastri et al. |
| 7,539,358 B2 | 5/2009 | Montgomery et al. |
| 7,657,130 B2 | 2/2010 | Shastri et al. |
| 2011/0018129 A1* | 1/2011 | Suzuki ............... H01L 27/0292 257/737 |

(Continued)

FOREIGN PATENT DOCUMENTS

| | | |
|---|---|---|
| DE | 102004007251 A1 | 9/2005 |
| JP | 2006301379 A | 11/2006 |

OTHER PUBLICATIONS

Liu, et al., "A High-Speed Silicon Optical Modulator Based on a Metal-Oxide-Semiconductor Capacitor," Letters to Nature, Nature, vol. 427, Feb. 12, 2004, pp. 615-618.

(Continued)

*Primary Examiner* — Uyen Chau N Le
*Assistant Examiner* — Chad Smith
(74) *Attorney, Agent, or Firm* — Conley Rose, P.C.

(57) ABSTRACT

An optical modulator comprises a silicon substrate, a buried oxide (BOX) layer disposed on top of the silicon substrate, and a ridge waveguide disposed on top of the BOX layer and comprising a first n-type silicon (n-Si) slab, a first gate oxide layer coupled to the first n-Si slab, a first p-type silicon (p-Si) slab coupled to the first gate oxide layer, and a light propagation path that travels sequentially through the first n-Si slab, the first gate oxide layer, and the first p-Si slab.

18 Claims, 16 Drawing Sheets

(56) References Cited

U.S. PATENT DOCUMENTS

2011/0073989 A1   3/2011   Rong et al.
2011/0176762 A1*  7/2011   Fujikata .................. G02F 1/025
                                                        385/2

OTHER PUBLICATIONS

Liao, et al., "High Speed Silicon Mach-Zehnder Modulator," Optics Express, vol. 13, No. 8, Apr. 18, 2005, pp. 3129-3135.
Partial English Translation and Abstract of Japanese Patent Application No. JP2006301379, Jun. 24, 2015, 8 pages.
Foreign Communication From a Counterpart Application, PCT Application No. PCT/US2015/012929, International Search Report dated Apr. 2, 2015, 4 pages.
Foreign Communication From a Counterpart Application, PCT Application No. PCT/US2015/012929, Written Opinion dated Apr. 2, 2015, 7 pages.

* cited by examiner

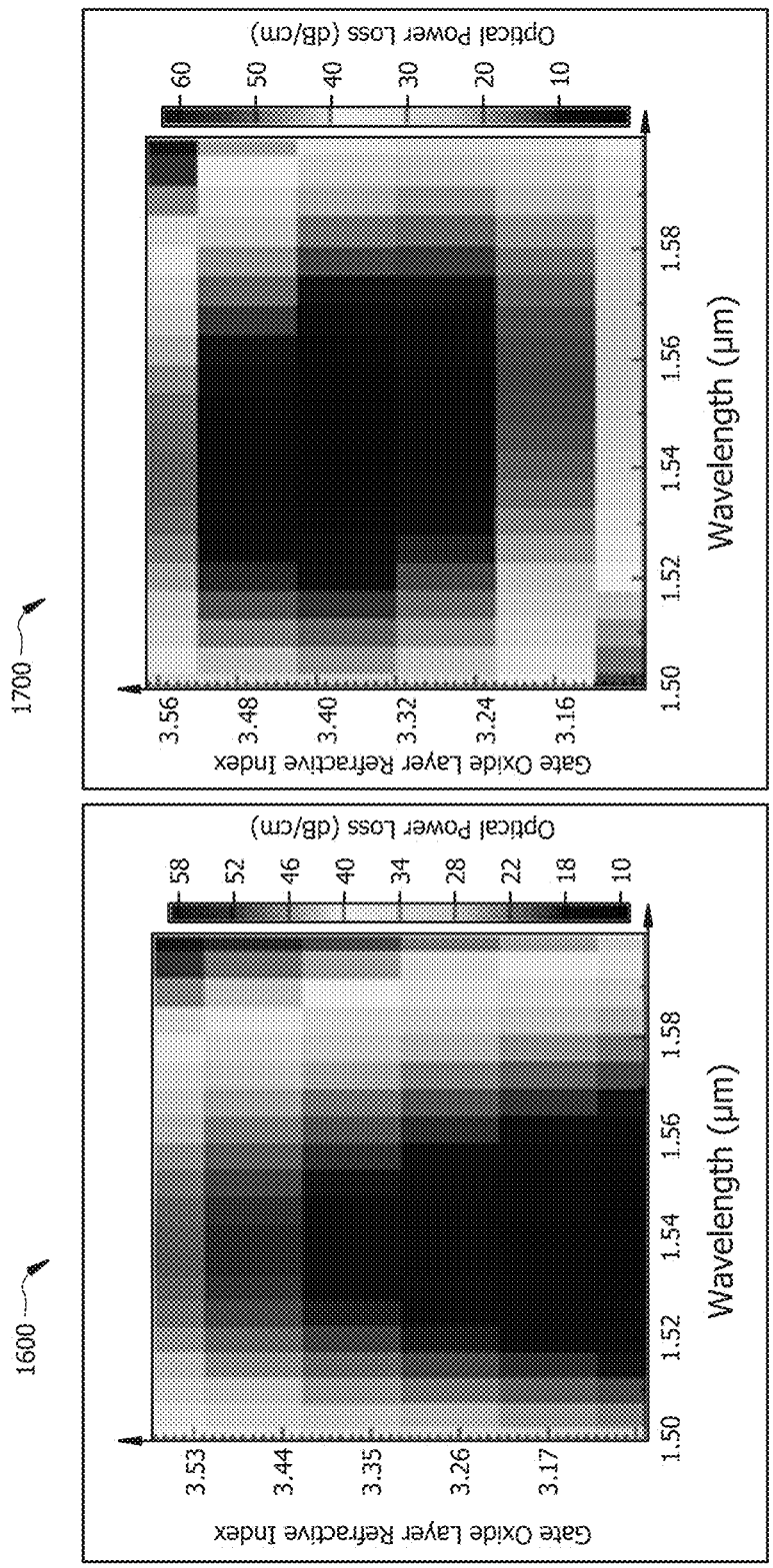

INTERDIGITATED OPTICAL MODULATOR

CROSS-REFERENCE TO RELATED APPLICATIONS

The present application claims priority to U.S. Provisional Patent Application 61/932,857 filed Jan. 29, 2014 by Dawei Zheng, et al., and titled "Silicon/Dielectric/Silicon Interleaving Optical Modulator," which is incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A compact, on-chip optical modulator is a key component for enabling optical interconnect systems on a microelectronic chip for various applications, such as optical communications, radio-frequency (RF) waveform generation, and optical signal processing. An on-chip optical modulator made of silicon is referred to as a silicon optical modulator. A silicon optical modulator is also a key component of a silicon optical transceiver.

There are at least four parameters to characterize a silicon optical modulator: $V_\pi$, the voltage swing required to achieve a π phase shift; insertion loss; modulation speed; and modulation efficiency. A small $V_\pi$ indicates that a small voltage induces a phase shift, so a silicon optical modulator with a small $V_\pi$ consumes relatively less power. Insertion loss is defined as the power loss due to the insertion of the silicon optical modulator into a system and is related to the length of the silicon optical modulator. For example, a longer silicon optical modulator has more insertion loss than a shorter silicon optical modulator. Modulation speed corresponds to the maximum data rate of the RF signals that the silicon optical modulator can modulate with. Normally, $V_\pi$ is a trade-off with insertion loss and modulation speed because a longer silicon optical modulator allows for a smaller $V_\pi$, but results in a slower modulation speed and higher insertion loss. Modulation efficiency is related to the product of $V_\pi$ and L, where L is the length required to achieve a π phase shift. A high modulation efficiency corresponds to a small product of $V_\pi$ and L.

A silicon optical modulator may allow for integration into existing conventional complementary metal-oxide-semiconductor (CMOS) processing platforms. However, early silicon optical modulators, which employed a lateral p-n junction and a traveling wave modulator architecture following the design of traditional modulators fabricated from group III-V compounds such as indium phosphide (InP), gallium arsenide (GaAs), and lithium niobate (LiNbO$_3$), suffered from high optical insertion loss, high power consumption, and a limited optical extinction ratio. In addition, silicon has a reasonable free-carrier plasma dispersion effect, but has less electro-optical modulation efficiency than group III-V and II-III materials.

SUMMARY

In one embodiment, the disclosure includes an optical modulator comprising a silicon substrate, a buried oxide (BOX) layer disposed on top of the silicon substrate, and a ridge waveguide disposed on top of the BOX layer and comprising a first n-type silicon (n-Si) slab, a first gate oxide layer coupled to the first n-Si slab, a first p-type silicon (p-Si) slab coupled to the first gate oxide layer, and a light propagation path that travels sequentially through the first n-Si slab, the first gate oxide layer, and the first p-Si slab.

In another embodiment, the disclosure includes an optical modulation system comprising a radio frequency (RF) source, a direct current (DC) voltage supply, a bias tee coupled to the RF source and the DC voltage supply, an optical transmitter, an optical modulator coupled to the bias tee and the optical transmitter and comprising a plurality of interdigitated structures coupled to each other, wherein each interdigitated structure comprises an n-Si slab, a gate oxide layer coupled to the n-Si slab, and a p-Si slab coupled to the gate oxide layer; and optical receiver coupled to the optical modulator.

In yet another embodiment, the disclosure includes a method comprising first, passing a light through a first n-Si slab, second, passing the light through a first gate oxide layer coupled to the first n-Si slab, third, passing the light through a first p-Si slab coupled to the first gate oxide layer, fourth, passing the light through a second gate oxide layer coupled to the first p-Si slab, fifth, passing the light through a second n-Si slab coupled to the second gate oxide layer, sixth, passing the light through a third gate oxide layer coupled to the second n-Si slab, seventh, passing the light through a second p-Si slab coupled to the third gate oxide layer, and modulating, using an anode and a cathode, the light with data.

In yet another embodiment, the disclosure includes a method comprising providing a silicon substrate, forming a BOX layer on top of the silicon substrate, forming a plurality of interdigitated structures on top of the BOX layer, wherein each interdigitated structure comprises an n-Si slab, a gate oxide layer coupled to the n-Si slab, and a p-Si slab coupled to the gate oxide layer, and wherein the interdigitated structures define a light propagation path, coupling the interdigitated structures to each other, and forming an anode and a cathode on top of the interdigitated structures.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 16 is a graph of optical power loss for the silicon optical modulator in FIG. 6 and the silicon optical modulator in FIG. 12.

FIG. 17 is a graph of optical power loss for the silicon optical modulator in FIG. 6 and the silicon optical modulator in FIG. 12.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalent.

Figure 1:
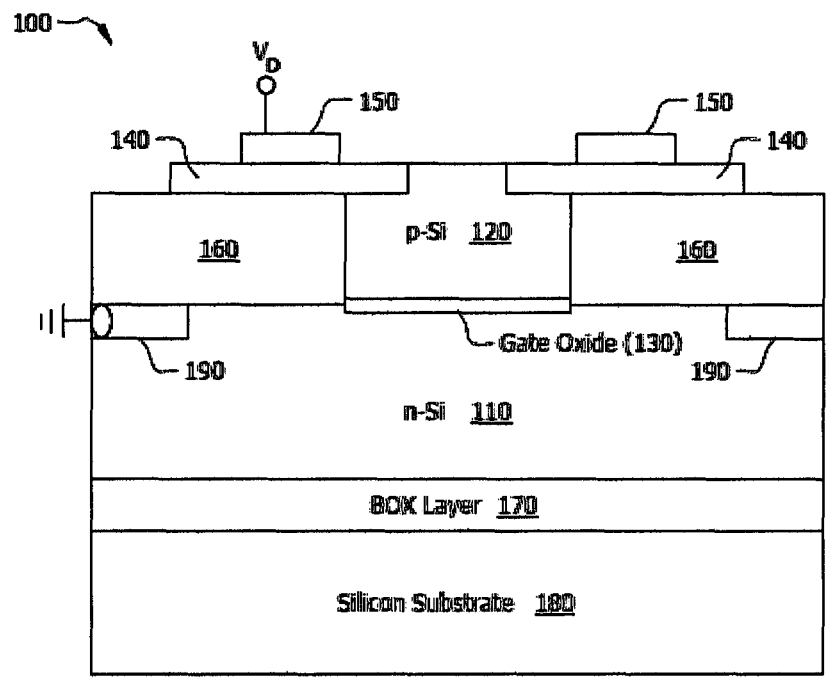
FIG. 1 is a schematic diagram of a silicon optical modulator.

FIG. 1 is a schematic diagram of a silicon optical modulator 100. The modulator 100 is based on a metal-oxide-semiconductor (MOS) capacitor structure embedded in a silicon waveguide as described in A. Liu, et al., "A high-speed silicon optical modulator based on a metal-oxide-semiconductor capacitor," Nature 427, pp. 615-618 (2004), which is incorporated by reference. The modulator 100 comprises a silicon substrate 180, a buried oxide ("BOX") layer 170, an n-Si slab 110, a gate oxide layer 130, a p-Si slab 120, two oxide regions 160, two polysilicon layers 140, and two metal contacts 150.

The silicon substrate 180 physically supports the modulator 100. The BOX layer 170 is positioned on top of the silicon substrate 180 and reduces optical loss along a light propagation path (not shown), which travels into or out of the page and thus simultaneously through the n-Si slab 110, the gate oxide layer 130, and the p-Si slab 120. The n-Si slab 110 is positioned on top of the BOX layer 170 and is grounded via a surface 190 with a doping of $1 \times 10^{19}$ centimeter$^{-3}$ (cm$^{-3}$) to minimize metal-semiconductor contact resistance. The n-Si slab 110 has an active doping of $1.7 \times 10^{16}$ cm$^{-3}$.

The gate oxide layer 130 is positioned on top of the n-Si slab 110 and induces strong polarization dependence of modal characteristics. The thickness of the gate oxide layer 130 is only 120 angstroms (Å). Differential capacitance is defined as the derivative of charge with respect to voltage. In this case, differential capacitance is measured per unit length, so the differential capacitance of the modulator 100 is inversely proportional to the thickness of the gate oxide layer 130. The modulator 100 therefore has a large differential capacitance, which enables a small voltage to charge or discharge a relatively large amount of electrons around the gate oxide layer 130 for a phase shift. Due to diffraction, the optical mode size where the maximum amount of light power is confined in the modulator 100 is about 222 nanometers (nm) high and 450 nm wide. Once the waveguide size is determined, the amount of electron charges to induce a certain phase change is fixed. The p-Si slab 120 is positioned on the top of the gate oxide layer 130. The p-Si slab 120 has an active doping of $3 \times 10^{16}$ cm$^{-3}$.

The oxide regions 160 are positioned on each side of the gate oxide layer 130 and the p-Si slab 120, maintain optical confinement, and minimize optical absorption by the metal contacts 150. The polysilicon layers 140 are positioned on top of the oxide regions 160 and further minimize optical absorption by the metal contacts 150. The metal contacts 150 are positioned on top of the polysilicon layers 140 and may comprise aluminum or any other suitable material. A voltage is applied to the p-Si slab 120 via the metal contacts 150.

First, the modulator 100 may be very short, for example shorter than 1 millimeter (mm), so no traveling wave design is needed. Second, the modulator 100 does not require a power-intensive common mode logic (CML) driver, so 0.9 volts (V) may be enough to drive the modulator 100. Third, the driver is very small. Fourth, the modulator 100 and the driver may be flip-chip bonded, which allows for a more compact package. However, other components of the modulator 100 are relatively big. Specifically, the n-Si slab 110 is about 1.4 micrometers (μm) thick, and the p-Si slab 120 is about 0.9 μm thick, which makes integration into existing CMOS platforms difficult.

Figure 2:
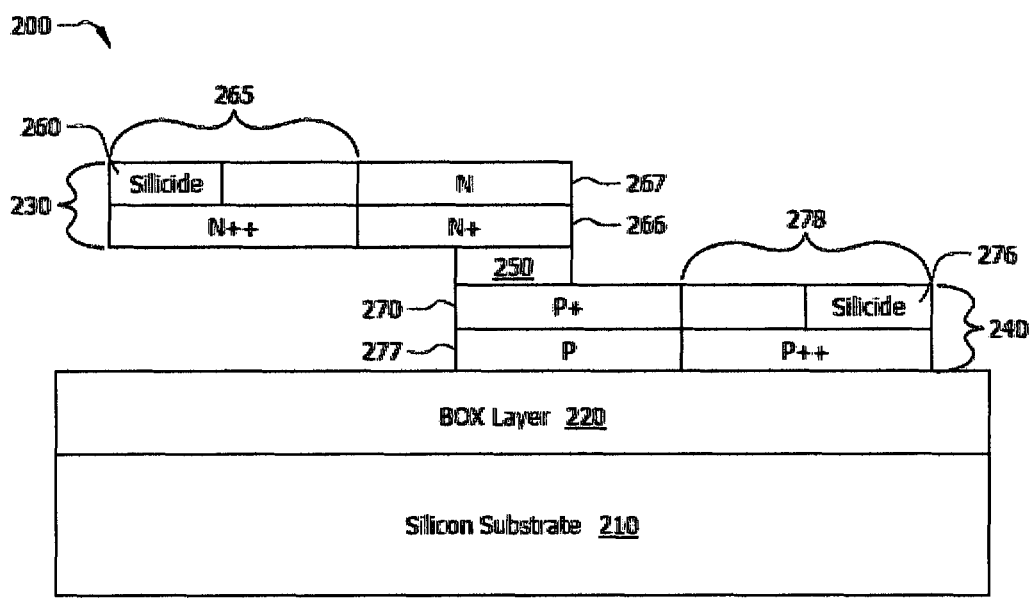
FIG. 2 is a schematic diagram of another silicon optical modulator.

FIG. 2 is a schematic diagram of another silicon optical modulator 200. The modulator 200 is based on a positive-intrinsic-negative (PIN) structure and is described in U.S. Pat. No. 6,845,198, which is incorporated by reference. The modulator 200 comprises a silicon substrate 210, a BOX layer 220, a p-Si slab 240, a gate oxide layer 250, and an n-Si slab 230.

The silicon substrate 210 is similar to the silicon substrate 180 and physically supports the modulator 200. The BOX layer 220 is similar to the BOX layer 170, is positioned on top of the silicon substrate 210, and reduces optical loss along a light propagation path (not shown), which travels into or out of the page and thus simultaneously through the p-Si slab 240, the gate oxide layer 250, and the n-Si slab 230.

The n-Si slab 230 comprises an n$^{++}$ region 265, an n$^{+}$ region 266, and an n region 267. The n$^{++}$ region 265 is a heavily-doped n-type region whose doping is on the order of $10^{19}$ cm$^{-3}$. The n$^{+}$ region 266 is a moderately-doped n-type region whose doping level is between that of the n$^{++}$ region 265 and the n region 267. The n region 267 is a lightly-doped n-type region whose doping is on the order of $10^{17}$ cm$^{-3}$ or is an un-doped region that reduces optical loss. A first silicide region 260 within the n$^{++}$ region 265 is formed by reacting a metal such as tantalum (Ta), cobalt (Co), nickel (Ni), molybdenum (Mo), tungsten (W), or titanium (Ti) into the outer area of the n$^{++}$ region 265 and serves as a first metal contact to connect with a cathode (not shown). The n$^{++}$ region 265 provides a low-resistance contact to the first silicide region 260.

The p-Si slab 240 comprises a p$^{++}$ region 278, a p$^{+}$ region 270, and a p region 277. The p$^{++}$ region 278 is a heavily-doped p-type region whose doping is on the order of $10^{19}$ cm$^{-3}$. The p$^{+}$ region 270 is a moderately-doped p-type region whose doping level is between that of the p$^{++}$ region 278 and the p region 277. The p region 277 is a lightly-doped p-type region whose doping is on the order of $10^{17}$ cm$^{-3}$ or is an un-doped region that reduces optical loss. A second silicide region 276 within the p$^{++}$ region 278 is similar to the first silicide region 260, is formed in the outer area of the p$^{++}$ region 278, and serves as a second metal contact to connect with an anode (not shown). The p$^{++}$ region 278 provides a low-resistance contact to the second silicide region 276. A voltage may be applied to the modulator 200 via the first silicide region 260 and the second silicide region 276. The gate oxide layer 250 is similar to the gate oxide layer 130 and is positioned between the n-Si slab 266 and the p-Si slab 270.

Figure 3:
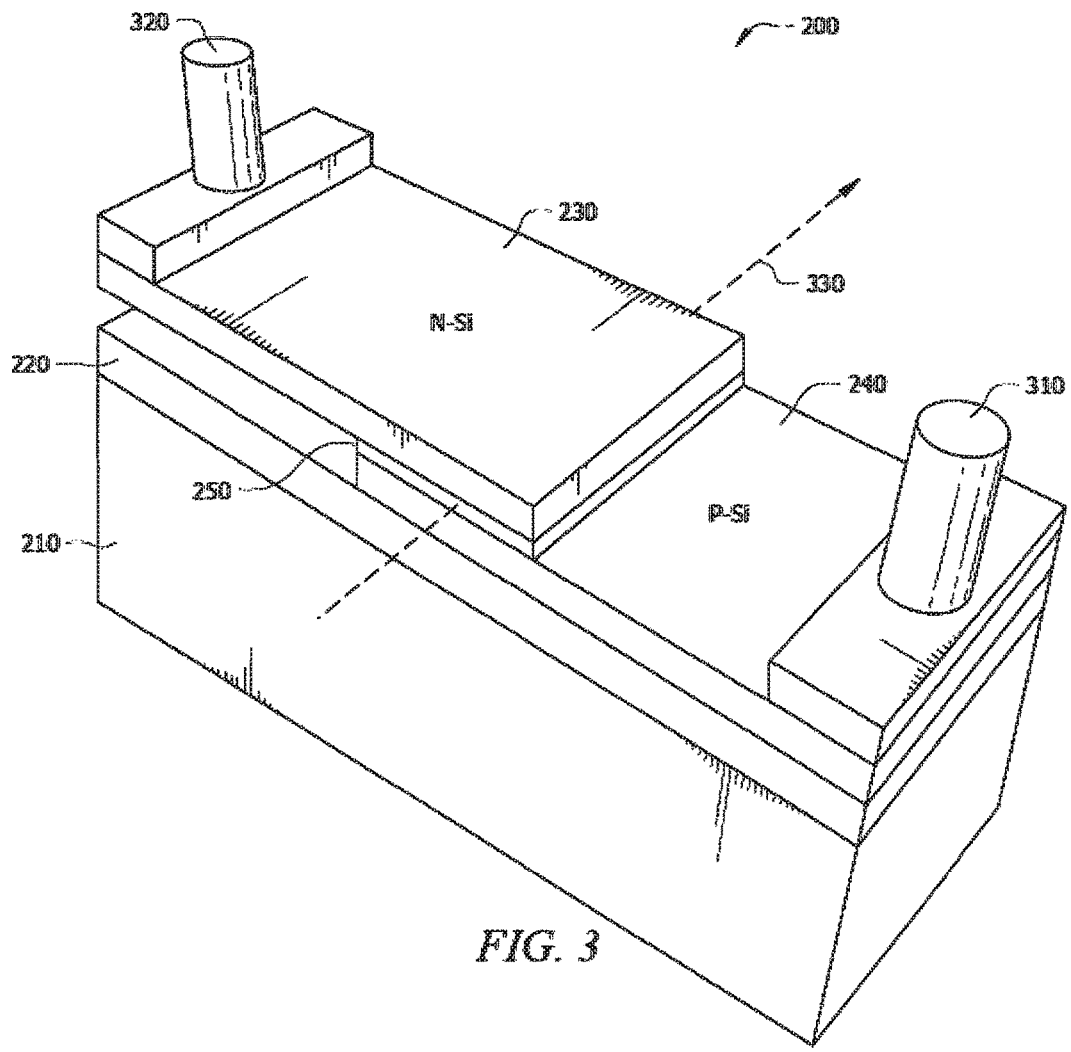
FIG. 3 is a perspective view of the silicon optical modulator in FIG. 2.

FIG. 3 is perspective view of the silicon optical modulator 200 in FIG. 2. Unlike FIG. 2, FIG. 3 shows that the modulator 200 further comprises an anode 310, a cathode 320, and a light propagation path 330. The anode 310 is on top of the p-Si slab 240, and the cathode 320 is on top of the n-Si slab 230. Similar to the first silicide region 260 and the second silicide region 276, the anode 310 and the cathode 320 may comprise Ta, Co, Ni, Mo, W, Ti, or any other suitable materials for conduction. As shown, the light propagation path 330 travels simultaneously through the p-Si slab 240, the gate oxide layer 250, and the n-Si slab 230. Alternatively, it can be said that the light propagation path 330 travels parallel to the p-Si slab 240, the gate oxide layer 250, and the n-Si slab 230. In other words, if, for instance, the p-Si slab 240 has a length that runs from the front of the page to the back of the page, then the light propagation path 330 travels parallel to that length.

Figure 4:
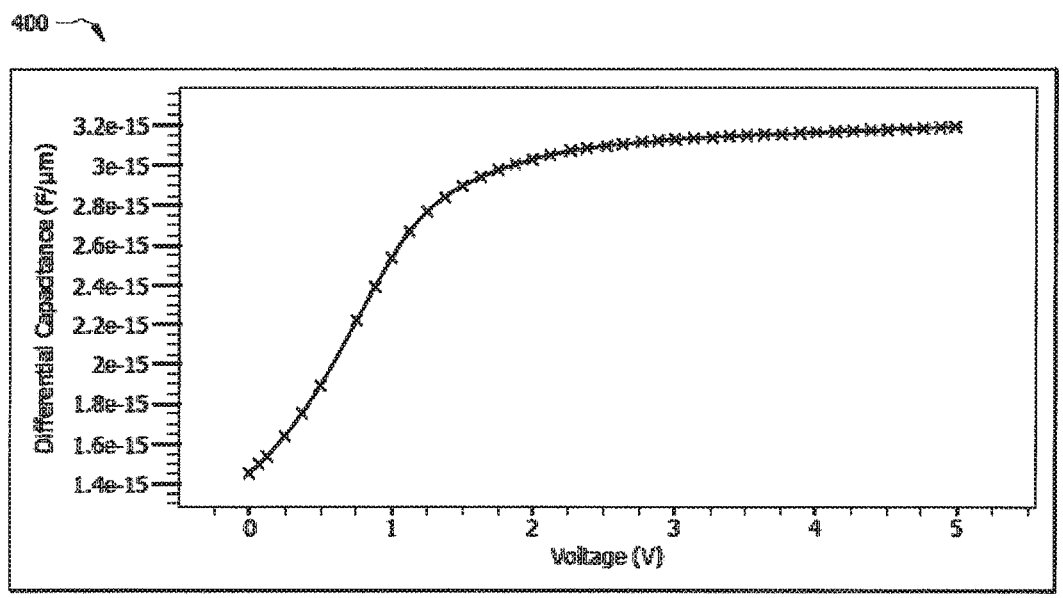
FIG. 4 is a graph of voltage versus differential capacitance for the silicon optical modulator in FIG. 2.

FIG. 4 is a graph 400 of voltage versus differential capacitance for the silicon optical modulator 200 in FIG. 2. As shown, the x-axis represents the voltage difference between the anode 310 and the cathode 320 in V. The y-axis represents the differential capacitance in farads per micrometer (F/μm). The graph 400 shows that the differential capacitance increases rapidly when the voltage increases from 0 V to 1 V, increases slowly when the voltage increases from 1 V to 3 V, and levels off when the voltage exceeds 3 V.

The fabrication process for the modulator 200 requires ultra-shallow implantation of dopants in order to avoid damage to the gate oxide layer 250. Such a fabrication process is difficult to implement. There is therefore a need for a compact silicon optical modulator that requires a relatively simple fabrication process.

Disclosed herein are embodiments for improved silicon optical modulators. Unlike the modulator 100 and the modulator 200, which comprise one n-Si slab 110 and 230, one gate oxide layer 130 and 250, and one p-Si slab 120 and 240, the disclosed modulators comprise a plurality of interdigitated, or interleaved, n-Si slabs, gate oxide layers, and p-Si slabs. Moreover, the disclosed modulator does not require ultra-shallow dopant implantation so that the fabrication process is simplified. In addition, in the disclosed modulators light travels perpendicularly to, and sequentially through, the n-Si slabs, the gate oxide layers, and the p-Si slabs. Furthermore, introducing high-κ materials for the gate oxide layers may reduce reflection. Finally, the disclosed modulators have a high modulation efficiency of at least 2 V·mm, as well as low power consumption.

Figure 5:
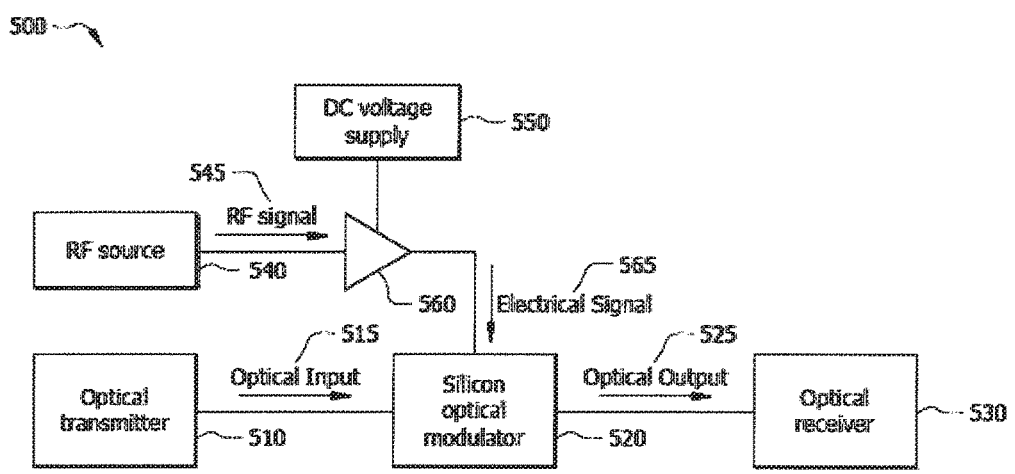
FIG. 5 is a schematic diagram of an optical system.

FIG. 5 is a schematic diagram of an optical system 500. The system 500 comprises an optical transmitter 510, a radio frequency (RF) source 540, a direct current (DC) voltage supply 550, a bias tee 560 coupled to the RF source 540 and the DC voltage supply 550, a silicon optical modulator 520 coupled to the optical transmitter 510 and the bias tee 560, and an optical receiver 530 coupled to the silicon optical modulator 520. The components of the optical system 500 may be arranged as shown or in any other suitable manner.

The optical transmitter 510 is any suitable optical transmitter configured to generate and transmit an optical input 515. For example, the optical transmitter 510 may comprise a laser diode (LD), a light emitting diode (LED), or another optical source. The RF source 540 is any suitable RF source configured to generate and transmit an RF signal 545. For example, the RF source 540 may generate a sinusoidal RF signal or a pseudo-random bit sequence (PRBS). The DC voltage supply 550 is any suitable DC voltage supply configured to provide a voltage. The bias tee 560 is any suitable device configured to combine the RF signal 545 and the voltage to create an electrical signal 565.

The modulator 520 may be one of the modulators described below. The modulator 520 is configured to modulate the intensity, the phase, or both of the optical input 515 and to be driven by the electrical signal 565 to produce an optical output 525. The optical receiver 530 is any suitable optical receiver configured to receive the optical output 525. For example, the optical receiver 530 may comprise an optical spectrum analyzer (OSA), a power meter, or a photodiode.

In operation, the optical input 515 generated by the optical transmitter 510 enters the modulator 520. The bias tee 560 combines the RF signal 545 generated by the RF source 540 and the voltage from the DC voltage supply 550 to create the electrical signal 565. The modulator 520 modulates the optical input 515 with the electrical signal 565 to produce the optical output 525. Finally, the optical receiver 530 receives the optical output 525 for further processing.

Figure 6:
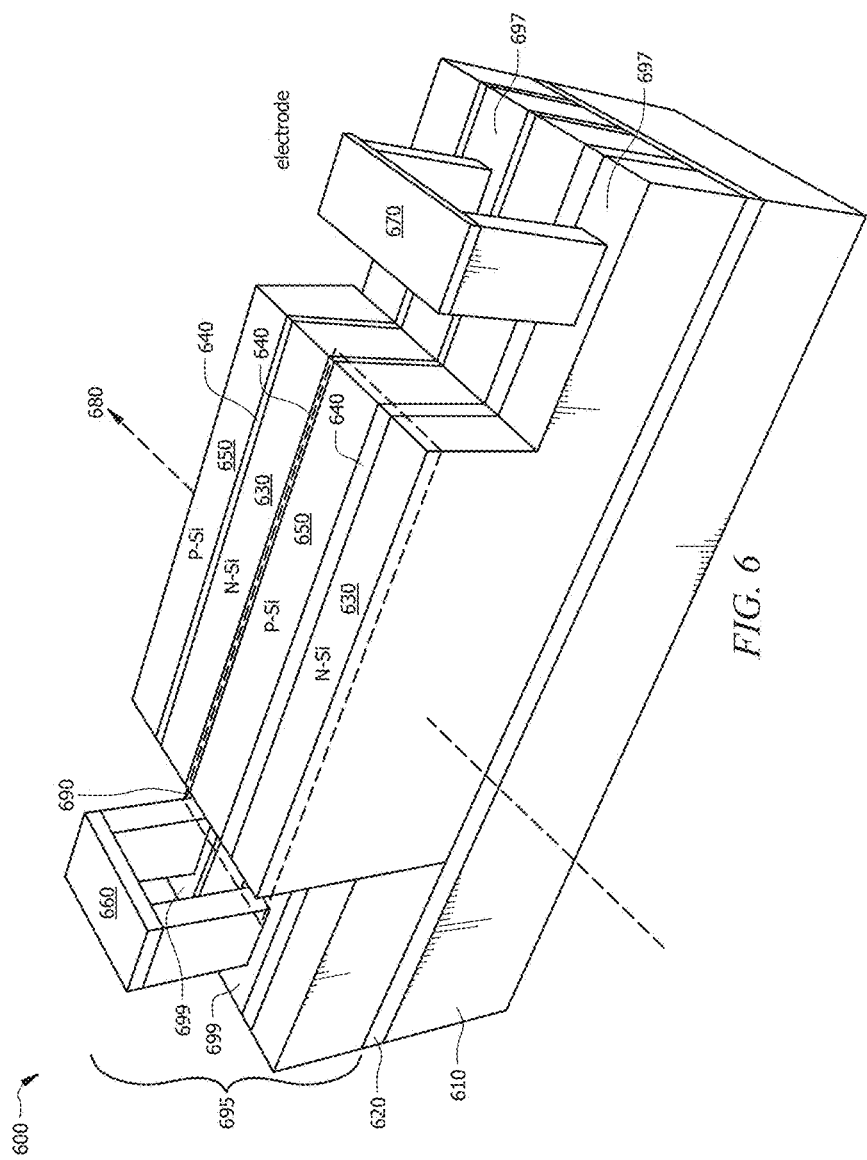
FIG. 6 is a schematic diagram of a silicon optical modulator according to an embodiment of the disclosure.

FIG. 6 is a schematic diagram of a silicon optical modulator 600 according to an embodiment of the disclosure. The modulator 600 comprises a silicon substrate 610, a BOX layer 620, two n-Si slabs 630, three gate oxide layers 640, two p-Si slabs 650, an anode 660, and a cathode 670. One group of a first n-Si slab 630, a first gate oxide layer 640, and a first p-Si slab 650 forms a first p Si-dielectric-n Si interdigitated structure 690. The modulator 600 comprises three interdigitated structures 690 to form a ridge waveguide 695. The components may be arranged as shown or in any other suitable manner.

The silicon substrate 610 is positioned at the bottom of the modulator 600 and is configured to physically support the modulator 600. The BOX layer 620 is positioned on top of the silicon substrate 610. The BOX layer 620 may be greater than 0.2 μm thick to reduce optical loss along a light propagation path 680. The light propagation path 680 travels sequentially through the n-Si slab 630, the gate oxide layer 640, and the p-Si slab 650 in the labeled interdigitated structure 690. Alternatively, it can be said that the light propagation path 680 travels perpendicularly to the n-Si slab 630, the gate oxide layer 640, and the p-Si slab 650. In other words, if, for instance, the n-Si slab 630 has a length that runs from the left side of the page to the right side of the page, then the light propagation path 680 travels perpendicularly to that length. Similarly, the light propagation path 680 travels perpendicularly to, and sequentially through, the p-Si slab 650, the gate oxide layer 640, and the n-Si slab 630 in a interdigitated structure 690 abutting the labeled interdigitated structure 690. While the light propagation path 680 is shown as traveling diagonally from left to right, it may also travel in the opposite direction. In addition, while light may reflect or otherwise travel in different directions, the light propagation path 680 is the primary path for light to travel through the modulator 600.

The n-Si slabs 630 are primarily doped with donors and therefore comprise a larger electron concentration than hole concentration. The p-Si slabs 650 are primarily doped with acceptors and therefore comprise a larger hole concentration than electron concentration. The gate oxide layer 640, which may be generically referred to as a gate dielectric layer 640, may comprise dielectric materials such as bismuth oxide ($Bi_2O_3$), silicon nitride ($Si_3N_4$), and silicon oxynitride ($Si_xN_y$) that allow for relatively fast charging and discharging. The gate oxide layer 640 is configured to facilitate the movement of free carriers into and out of the n-Si slabs 630 and the p-Si slabs 650.

The anode 660 and the cathode 670 comprise Ta, Co, Ni, Mo, W, Ti, copper (Cu), aluminum (Al), or any other metal materials suitable for conduction. The anode 660 is coupled to first surfaces 699 of the p-Si slabs 650. The cathode 670 is coupled to second surfaces 697 of the n-Si slabs 630. The optical field is confined by the ridge waveguide 695 so that optical absorption by the anode 660 and the cathode 670 may be greatly reduced. A voltage may be applied to the modulator 600 through the anode 660 and the cathode 670 in order to modulate light traveling along the light propagation path 680. Connecting the anode 660 to a positive terminal of a voltage and the cathode 670 to a negative terminal of the voltage corresponds to a forward bias. The modulator 600 is typically operated with a forward bias.

In operation, a forward bias voltage is applied to the modulator 600 through the anode 660 and the cathode 670 to induce an accumulation of charges on both sides of the gate oxide layers 640. The accumulation of charges changes the carrier concentration on each side of the gate oxide layers 640, which in turn modifies a refractive index of the first ridge waveguide 695 and modifies an optical phase and amplitude of light passing through the light propagation path 680. This modification is referred to as the free-carrier plasma dispersion effect.

Under forward bias, the modulator 600 may have a large differential capacitance of about 1.3 femtofarads per micrometer (fF/µm) and a very high modulation efficiency of about 2 V·mm. Additionally, the modulator 600 may be driven by a CMOS driver (not shown) with an about ±1 V voltage swing. The modulator 600 therefore is relatively small and consumes relatively less power.

The modulator 600 may comprise any suitable number of the interdigitated structures 690. Moreover, the amount of phase modulation is proportional to the number of the interdigitated structures 690. For example, assuming a same applied voltage, a modulator 600 comprising four interdigitated structures 690 can provide twice as much phase modulation as a modulator 600 comprising two interdigitated structures 690. Additionally, the number of the interdigitated structures 690 may be designed so that the resonance wavelength of the modulator 600 is out of the range of wavelengths being used. For example, a suitable width of the n-Si slab 630 or the p-Si slab 650 may be between 260 nm and 300 nm for O-band (i.e., wavelengths between 1260 nm and 1360 nm) optical communications. Therefore, the width of the interdigitated structure 690 may be between 520 nm and 600 nm.

Figure 7:
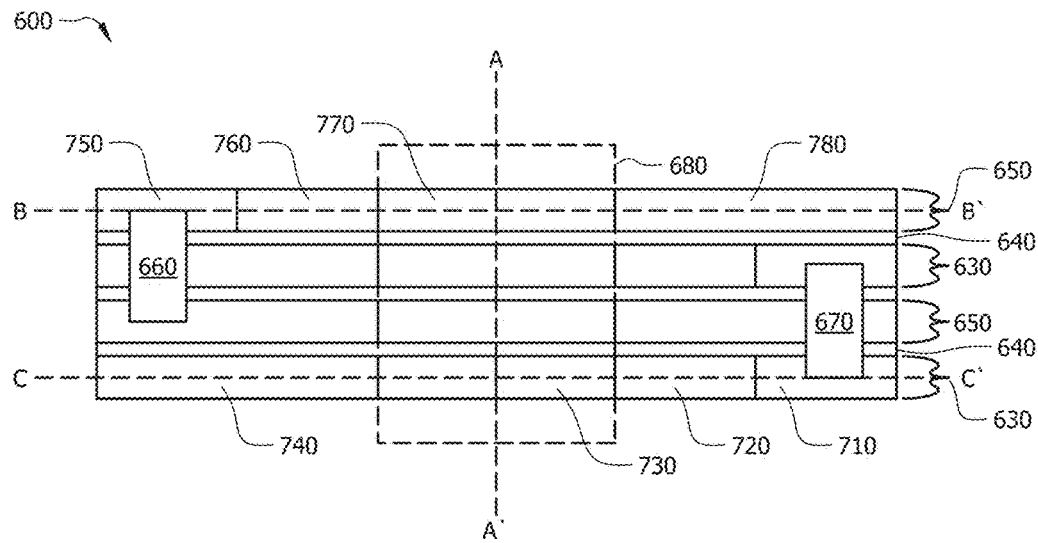
FIG. 7 is a top view of the silicon optical modulator in FIG. 6.

FIG. 7 is a top view of the silicon optical modulator 600 in FIG. 6. Unlike FIG. 6, FIG. 7 shows different doping profiles in the n-Si slabs 630 and in the p-Si slabs 650. Specifically, the n-Si slabs 630 comprise an $n^{++}$ portion 710, an $n^+$ portion 720, an n portion 730, and a first variably-doped portion 740. The $n^{++}$ portion 710 is a heavily-doped n-type portion and provides a low-resistance contact with the cathode 670. The $n^+$ portion 720 is a moderately-doped n-type portion and provides an efficient movement of electrons between the $n^{++}$ portion 710 and the n portion 730. The n portion 730 is a lightly-doped n-type portion and supports optical modes with reduced optical loss. The first variably-doped portion 740 does not have a designed doping level. Rather, the first variably-doped portion 740 may be un-doped, lightly n doped, moderately n doped, or heavily n doped.

Similarly, the p-Si slabs 650 comprise a $p^{++}$ portion 750, a $p^+$ portion 760, a p portion 770, and a second variably-doped portion 780. The $p^{++}$ portion 750 is a heavily-doped p-type portion and provides a low-resistance contact with the anode 660. The $p^+$ portion 760 is a moderately-doped p-type portion and provides an efficient movement of holes between the $p^{++}$ portion 750 and the p portion 770. The p portion 770 is a lightly-doped p-type portion and supports optical modes with reduced optical loss. The second variably-doped portion 780 does not have a designed doping level. Rather, the second variably-doped portion 780 may be lightly n doped, un-doped, lightly p doped, moderately p doped, or heavily p doped.

Figure 8:
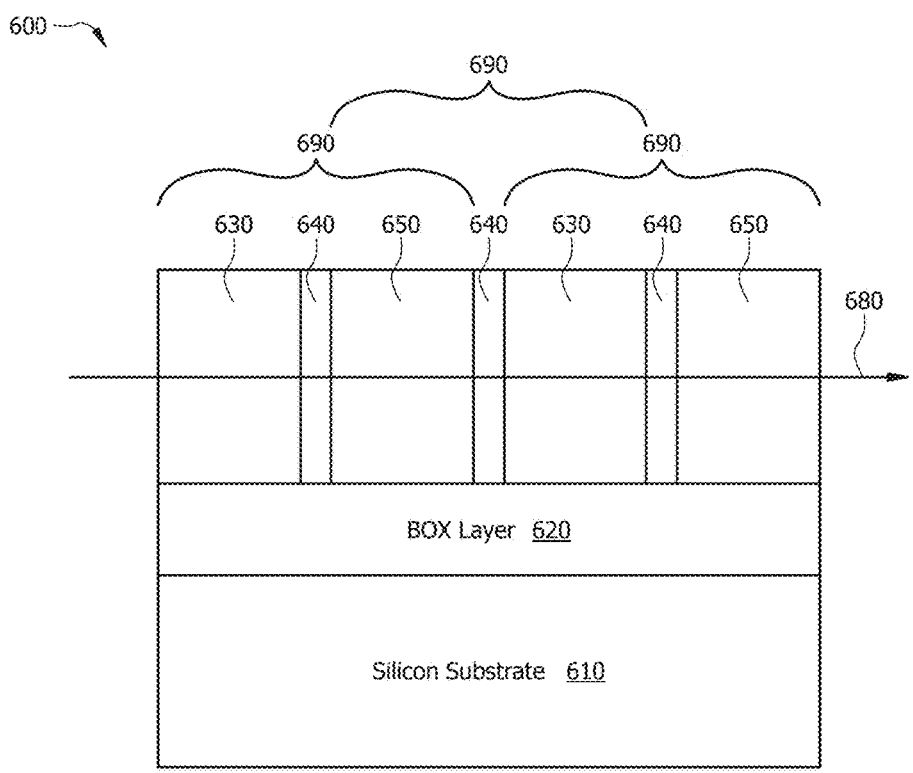
FIG. 8 is a cross-sectional view of the silicon optical modulator taken along the A-A' cutline in FIG. 7.

FIG. 8 is a cross-sectional view of the silicon optical modulator 600 taken along the A-A' cutline in FIG. 7. FIG. 8 highlights the interdigitated nature of the interdigitated structures 690. As can be seen, the modulator 600 comprises three interdigitated structures 690, and the light propagation path 680 travels sequentially through them and their components.

Figure 9:
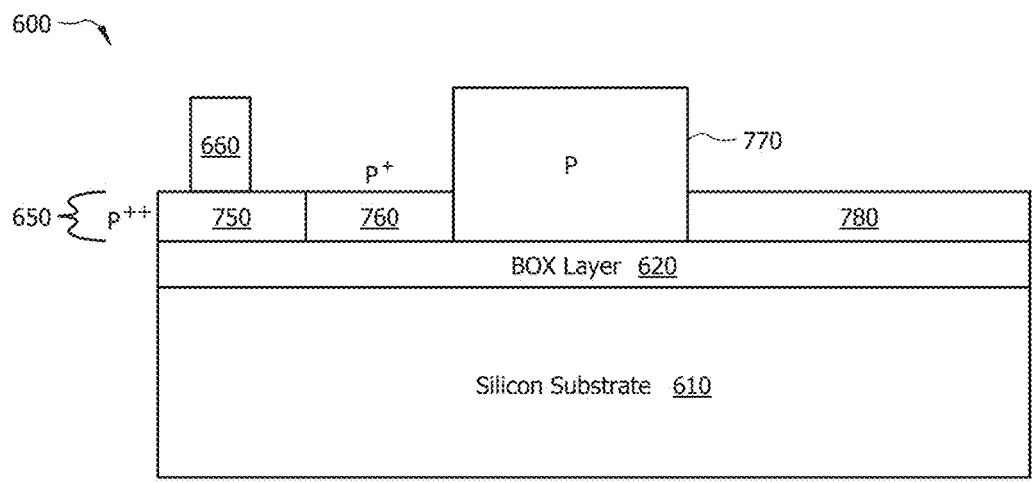
FIG. 9 is another cross-sectional view of the silicon optical modulator taken along the B-B' cutline in FIG. 7.

FIG. 9 is another cross-sectional view of the silicon optical modulator 600 taken along the B-B' cutline in FIG. 7. FIG. 9 highlights the configuration of the p-Si slabs 650. As can be seen, the p-Si slab 650 comprises the $p^{++}$ portion 750, the $p^+$ portion 760, the p portion 770, and the second variably-doped portion 780.

Figure 10:
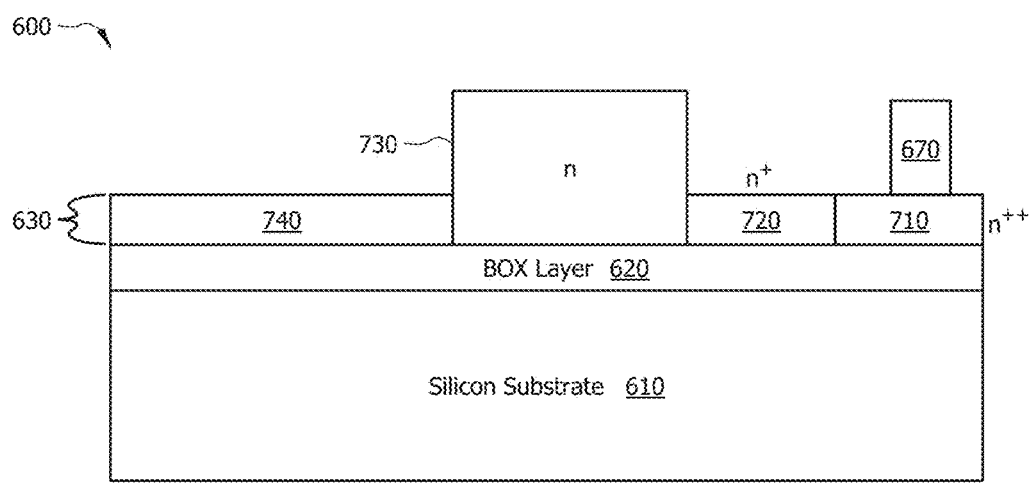
FIG. 10 is another cross-sectional view of the silicon optical modulator taken along the C-C' cutline in FIG. 7.

FIG. 10 is another cross-sectional view of the silicon optical modulator 600 taken along the C-C' cutline in FIG. 7. FIG. 10 highlights the configuration of the n-Si slabs 630. As can be seen, the n-Si slab 630 comprises the $n^{++}$ portion 710, the $n^+$ portion 720, the n portion 730, and the first variably-doped portion 740.

Figure 11:
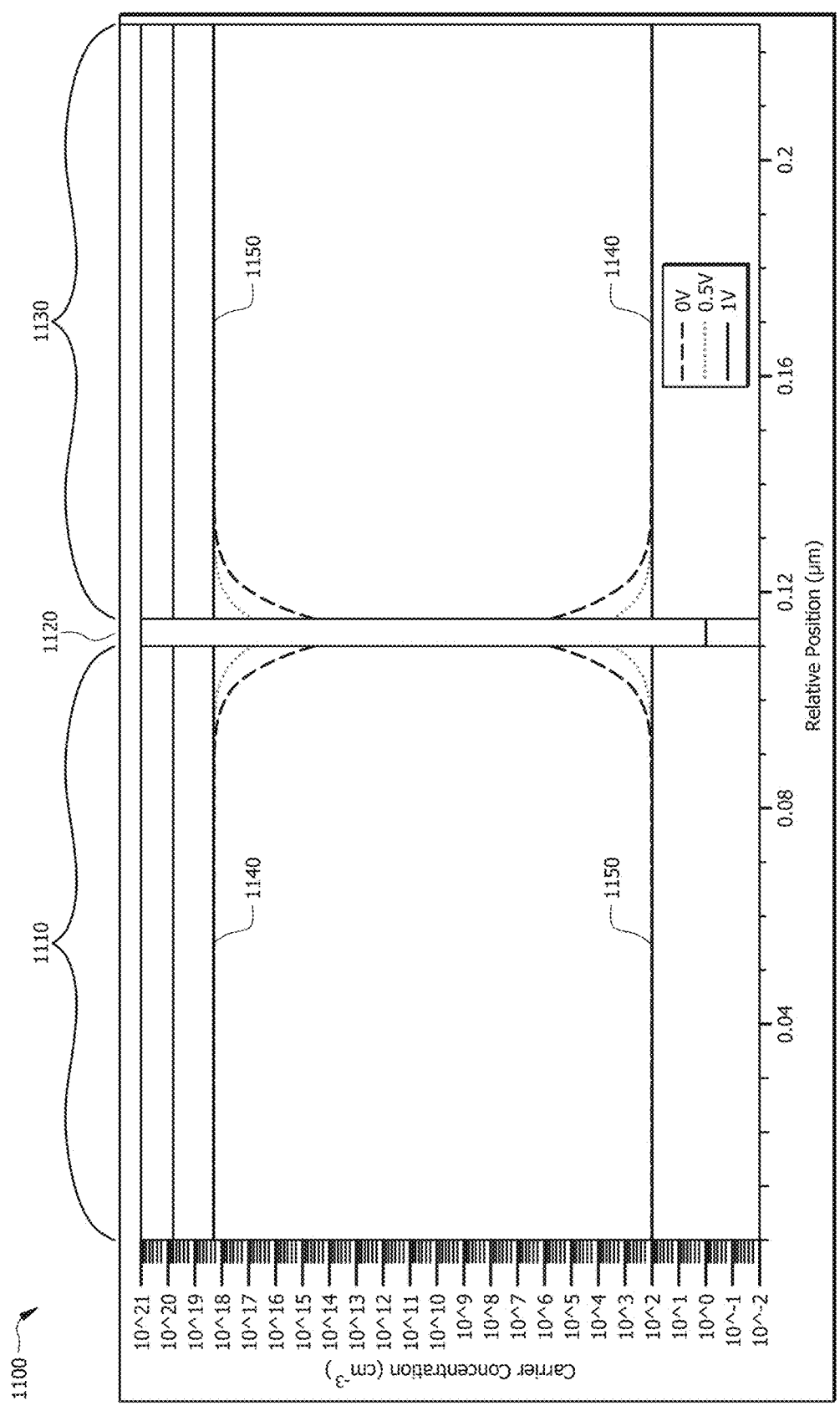
FIG. 11 is a graph of relative position versus local carrier concentration for the silicon optical modulator in FIG. 6.

FIG. 11 is a graph 1100 of relative position versus carrier concentration for the silicon optical modulator 600 in FIG. 6. As shown, the x-axis represents relative position in µm, and the y-axis represents carrier concentration in $cm^{-3}$. Relative position refers to the distance along the light propagation path 680 through one of the interdigitated structures 690. The carrier concentration is shown at three applied voltages, 0 V, 0.5 V, and 1 V. The carrier concentration along the signal propagation path 690 is similar for each additional interdigitated structure 690. It is assumed that the interdigitated structure 690 comprises a 110 nm thick n-Si slab 630, which is represented by an n region 1110, a 5 nm thick gate oxide layer 640, which is represented by a gate oxide region 1120, and a 110 nm thick p-Si slab 650, which is represented by a p region 1130.

As can be seen in the n region 1110, the electron concentration 1140 is much larger than the hole concentration 1150, the electron concentration 1140 begins to decrease when approaching the gate oxide region 1120, and the hole concentration 1150 begins to increase when approaching the gate oxide region 1120. In the gate oxide region 1120, no carriers exist because it is an insulator. In the p region 1130, the hole concentration 1150 is much larger than the electron concentration 1140, the hole concentration 1150 begins to increase when departing the gate oxide region 1120, and the electron concentration 1140 begins to decrease when departing the gate oxide region 1120. As can also be seen, increasing the applied voltage from 0 V to 0.5 V and 1.0 V causes smaller changes in carrier concentration near the gate oxide region 1120.

Figure 12:
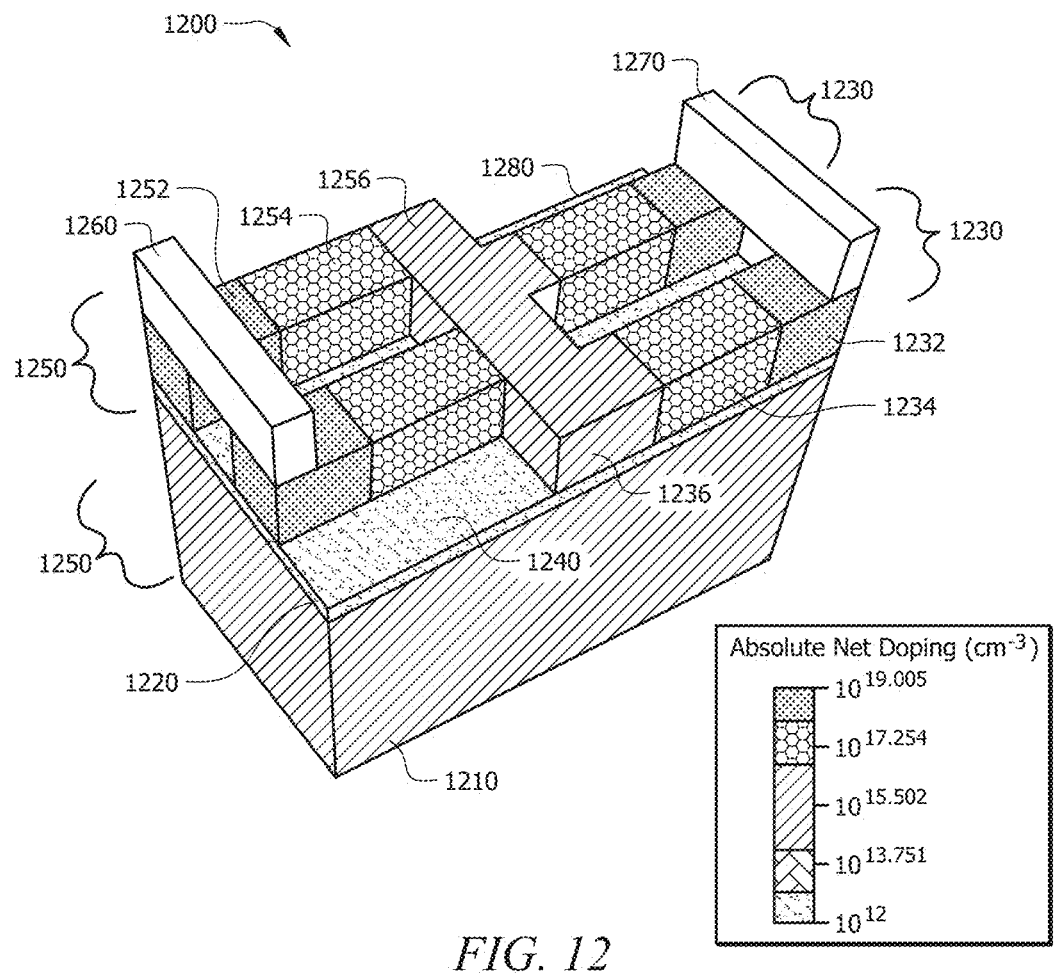
FIG. 12 is a schematic diagram of a silicon optical modulator according to another embodiment of the disclosure.

FIG. 12 is a schematic diagram of a silicon optical modulator 1200 according to another embodiment of the disclosure. FIG. 12 highlights the doping densities of the modulator 1200 in patterns. The modulator 1200 comprises a silicon substrate 1210, a BOX layer 1220, two n-Si slabs 1230, two p-Si slabs 1250, an anode 1260, and a cathode 1270, which are similar to the silicon substrate 610, the BOX layer 620, the two n-Si slabs 630, the two p-Si slabs 650, the anode 660, and the cathode 670. A gate oxide layer, light propagation path, and other components similar to those in the modulator 600 are not explicitly shown, though they may be present. The components may be arranged as shown or in any other suitable manner.

The n-Si slabs 1230 comprise an $n^{++}$ portion 1232, an $n^+$ portion 1234, and an n portion 1236. Unlike for the modulator 600, a variably-doped portion for the n-Si slab 1230 is physically omitted as shown by the space 1240. As shown, the doping of the n-Si slab 1230 decreases laterally towards the center of the modulator 1200 so that the doping of the $n^{++}$ portion 1232 is about $10^{19}$ cm$^{-3}$ to about $10^{20}$ cm$^{-3}$, the doping of the $n^+$ portion 1234 is about $10^{17}$ cm$^{-3}$ to about $10^{19}$ cm$^{-3}$, and the doping of the n portion 1236 is about $10^{15}$ cm$^{-3}$ to about $5 \times 10^{18}$ cm$^{-3}$.

The p-Si slabs 1250 comprise a $p^{++}$ portion 1252, a $p^+$ portion 1254, and a p portion 1256. Unlike for the modulator 600, a variably-doped portion for the p-Si slab 1250 is physically omitted as shown by the space 1280. As shown, the doping of the p-Si slab 1250 decreases laterally towards the center of the modulator 1200 so that the doping of the $p^{++}$ portion 1252 is about $10^{19}$ cm$^{-3}$ to about $10^{20}$ cm$^{-3}$, the doping of the $p^+$ portion 1254 is about $10^{17}$ cm$^{-3}$ to about $10^{19}$ cm$^{-3}$, and the doping of the p portion 1256 is about $10^{15}$ cm$^{-3}$ to about $5 \times 10^{18}$ cm$^{-3}$. Like the modulator 600, the modulator 1200 may comprise any suitable number of n-Si slabs 1230, gate oxide layers, and p-Si slabs 1250 to form any suitable number of interdigitated structures (not shown). The anode 1260 and the cathode 1270 are not doped and are therefore shown as hatched.

Figure 13:
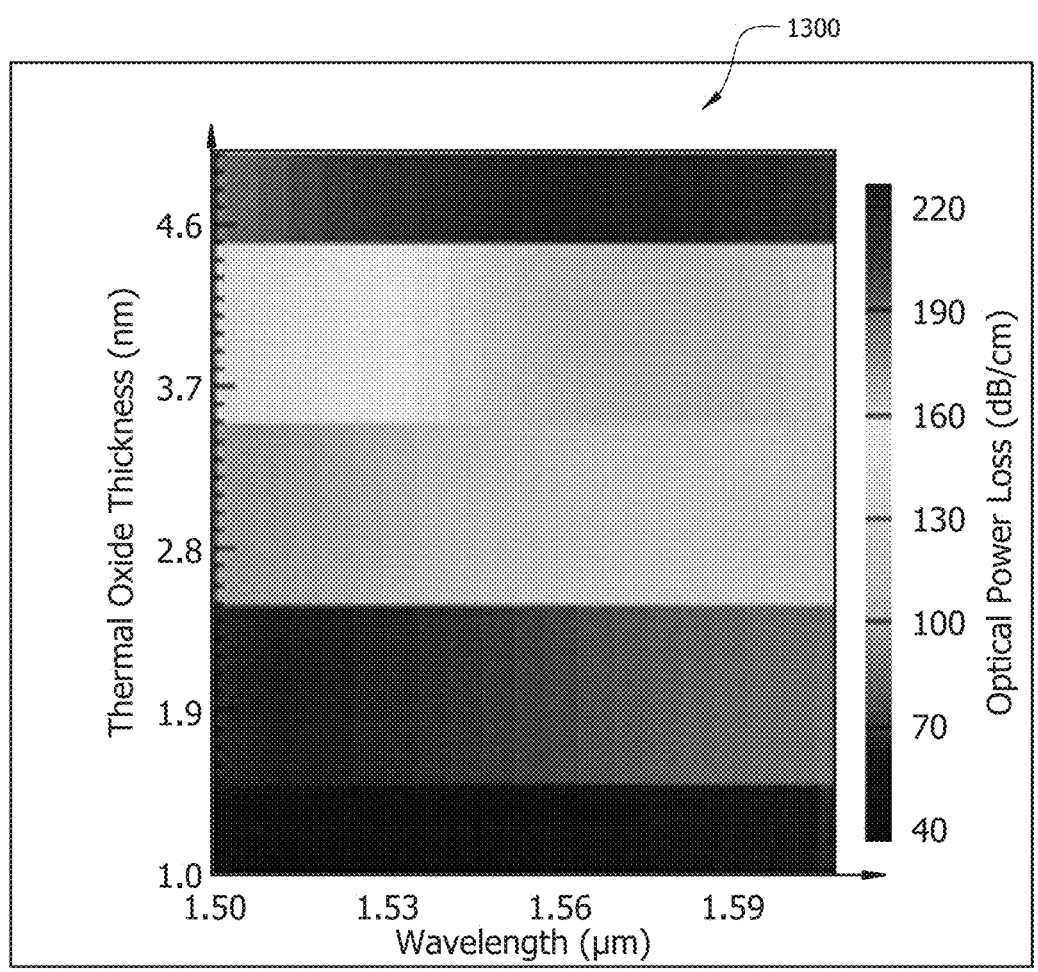
FIG. 13 is a graph of optical power loss for the silicon optical modulator in FIG. 6 and the silicon optical modulator in FIG. 12.

FIG. 13 is a graph 1300 of optical power loss for the silicon optical modulator 600 in FIG. 6 and the silicon optical modulator 1200 in FIG. 12. The x-axis represents wavelength in µm, the y-axis represents thermal oxide thickness in nm, and optical power loss is represented in grayscale in decibel per centimeter (dB/cm). The graph 1300 assumes a transverse electric (TE) mode for light, a gate oxide layer 640 comprising only thermal oxide, a 220 nm thick silicon-on-insulator (SOI) substrate, and a 300 nm wide interdigitated structure 690. As shown, the power loss increases as the thermal oxide thickness increases.

One way to reduce that power loss is to decrease the thermal oxide thickness. For example, the graph 1300 shows a power loss of less than 40 dB/cm when the thermal oxide thickness is less than 1.45 nm. However, the thermal oxide thickness may need to be more than 2 nm because anything less may trigger a large tunneling current and a high power leakage between the p-Si slab 650, 1250 and the n-Si slab 630, 1230. Therefore, achieving less than 40 dB/cm of power loss using thermal oxide in the gate oxide layer 640 is difficult.

The power loss is due to power reflection and radiation at the interface between the p-Si slab 650, 1250 and the gate oxide layer 640 and at the interface between the n-Si slab 630, 1230 and the gate oxide layer 640. The power reflection and radiation is induced by the high refractive index contrast between the silicon and the thermal oxide. For example, the refractive index of silicon is about 3.45 in the C-band (i.e., the wavelengths between 1528 nm and 1565 nm), and the refractive index of thermal oxide is about 1.44 in the C-band. Thus, pure thermal oxide limits performance. The power loss may be reduced when the refractive index of the gate oxide layer 640 matches the 3.45 refractive index of silicon.

To match the 3.45 refractive index of silicon, high-κ materials may be used in the gate oxide layer 640. High-κ materials are materials with a high dielectric constant, κ, for example hafnium dioxide ($HfO_2$), zirconium dioxide ($ZrO_2$), titanium dioxide ($TiO_2$), hafnium silicon oxynitride (HfSiON), and HfAlO. Using high-κ materials, the thickness of the gate oxide layer 640 may be smaller than 2 nm without inducing power leakage. Thus, by using high-κ materials and adjusting the refractive index of the high-κ materials to match the refractive index of silicon, power loss may be reduced. In addition, using high-κ materials may improve modulation efficiency.

Figure 14:
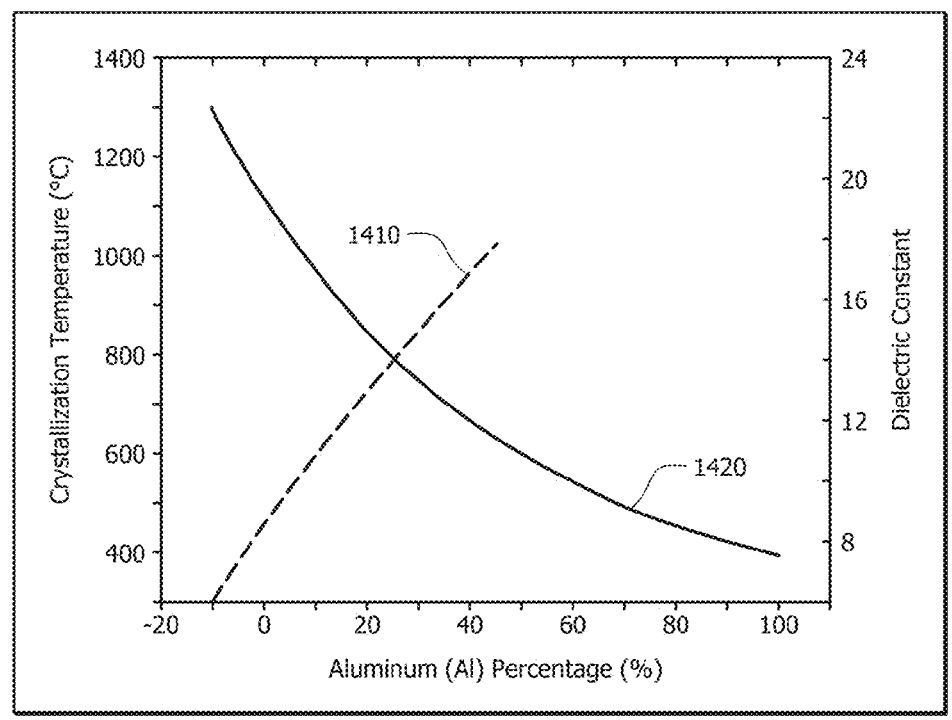
FIG. 14 is a graph of crystallization temperature and dielectric constant for hafnium aluminum oxide (HfAlO).

FIG. 14 is a graph 1400 of crystallization temperature and dielectric constant for HfAlO. The x-axis represents aluminum (Al) percentage in the HfAlO compound, the left y-axis represents crystallization temperature in degrees Celsius (° C.), and the right y-axis represents dielectric constant in constant or arbitrary units. The plot 1410 shows that an increased Al percentage leads to a higher crystallization temperature, and the plot 1420 shows that an increased Al percentage leads to a lower dielectric constant.

Dielectric constant is the square of refractive index. To match the 3.45 refractive index of silicon, the dielectric constant of the gate oxide layer 640 should be about 11.9025, which is the square of 3.45. For a dielectric constant of 11.9025, the plot 1420 shows an Al percentage of about 42%. Thus, the gate oxide layer 640 may comprise HfAlO with an Al percentage of about 42% or in a range between about 40% and about 44%. When the Al percentage is 42%, the plot 1410 shows a crystallization temperature of about 980° C. The refractive indices of other HfAlO combinations and other high-κ materials may similarly be matched to the refractive index of silicon.

Figure 15:
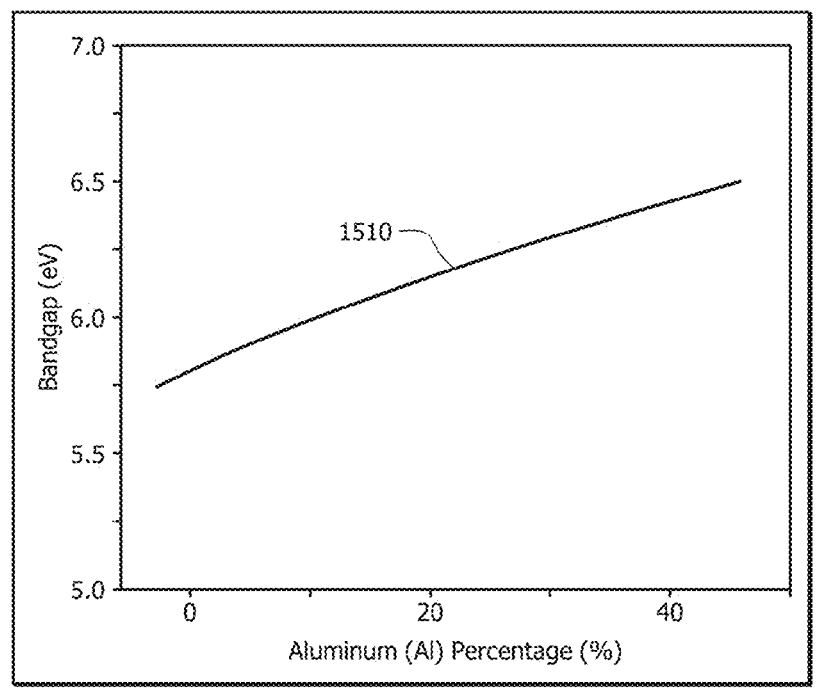
FIG. 15 is a graph of bandgap for HfAlO.

FIG. 15 is a graph 1500 of bandgap for HfAlO. The x-axis represents Al percentage in the HfAlO compound, and the y-axis represents bandgap in electron volts (eV). The plot 1510 shows that an increased Al percentage leads to a higher bandgap. When the Al percentage is about 42%, the plot 1510 shows that the bandgap is about 6.4 eV.

FIG. 16 is a graph 1600 of optical power loss for the silicon optical modulator 600 in FIG. 6 and the silicon optical modulator 1200 in FIG. 12. The x-axis represents wavelength in µm, the y-axis represents gate oxide layer 640 refractive index in constant or arbitrary units, and optical power loss is represented in grayscale in dB/cm. Unlike for the graph 1300, in which the gate oxide layer 640 comprises thermal oxide, the graph 1600 assumes that the gate oxide layer 640 comprises high-κ materials. The graph 1600 further assumes a transverse electric (TE) mode, a 3.15 refractive index of silicon, a 220 nm thick SOI substrate, a 300 nm wide interdigitated structure 690, and 5 nm thick gate oxide layer 640. As shown, the optical power loss decreases as the wavelength and the gate oxide layer 640 refractive index move to the middle of their respective ranges. Over most of the wavelengths and the gate oxide layer 640 refractive indices, the optical power loss remains manageable. Thus, the modulators 600, 1200 may be designed to use a wavelength and have a gate oxide layer 640 refractive index based on the graph 1600.

FIG. 17 is a graph 1700 of optical power loss for the silicon optical modulator 600 in FIG. 6 and the silicon optical modulator 1200 in FIG. 12. The x-axis represents wavelength in μm, the y-axis represents gate oxide layer 640 refractive index in constant or arbitrary units, and optical power loss is represented in grayscale in dB/cm. The graph 1700 is to the same as the graph 1600, except that the graph 1700 assumes a 2.5 nm thick gate oxide layer 640 instead of a 5 nm thick gate oxide layer 640. As shown, the optical power loss decreases as the wavelength and the gate oxide layer 640 refractive index move to the middle of their respective ranges. Thus, the modulators 600, 1200 may be designed to use a wavelength and have a gate oxide layer 640 refractive index based on the graph 1700. Furthermore, the modulators 600, 1200 may be designed to use a wavelength and have a gate oxide layer 640 refractive index based on graphs similar to the graphs 1600, 1700, but with different gate oxide layer 640 refractive indices. Moreover, as shown in the graphs 1600, 1700, the gate oxide layer 640 thickness may be adjusted in order to minimize optical power loss across a range of wavelengths and refractive indices.

The modulators 600, 1200 may be fabricated as follows: first, the BOX layer 620, 1220 is deposited on top of the silicon substrate 610, 1210. The thickness of the BOX layer 620, 1220 may be between 1.5 μm and 3 μm. Second, an SOI substrate is deposited on top of the BOX layer 620, 1220. The thickness of the SOI substrate may be between 100 nm and 500 nm. Third, a thin layer of oxide and a thin layer of $Si_3N_4$ are deposited on top of the SOI substrate. The thickness of the oxide may be 10 nm, and the thickness of the $Si_3N_4$ may be between 50 nm and 250 nm. Fourth, using the oxide and $Si_3N_4$ as a dry etch hard mask, the silicon is dry etched until the BOX layer 620, 1220 is reached. Fifth, thermal oxide or high-κ material is deposited on the SOI substrate to form the gate oxide layer 640. The thickness of the gate oxide layer 640 may be between 1 nm and 20 nm. Sixth, a polysilicon layer is deposited on the SOI substrate. The thickness of the polysilicon may be between 200 nm and 300 nm. Seventh, the polysilicon is polished with a chemical mechanical method until the $Si_3N_4$ layer is reached. Eighth, the $Si_3N_4$ is removed with wet chemicals, for example, phosphoric acid ($H_3PO_4$) at the temperature of about 150° C. Ninth, the n-Si slabs 630, 1230 and p-Si slabs 650, 1250 are formed via lithography, implantation, and annealing. The implantation need not be ultra-shallow, but may be deeper into the n-Si slabs 630, 1230 and the p-Si slabs 650, 1250. Tenth, the ridge waveguide 695 is formed via lithography and dry etching. Eleventh, the anodes 660, 1260 and the cathodes 670, 1270 are formed.

Figure 18:
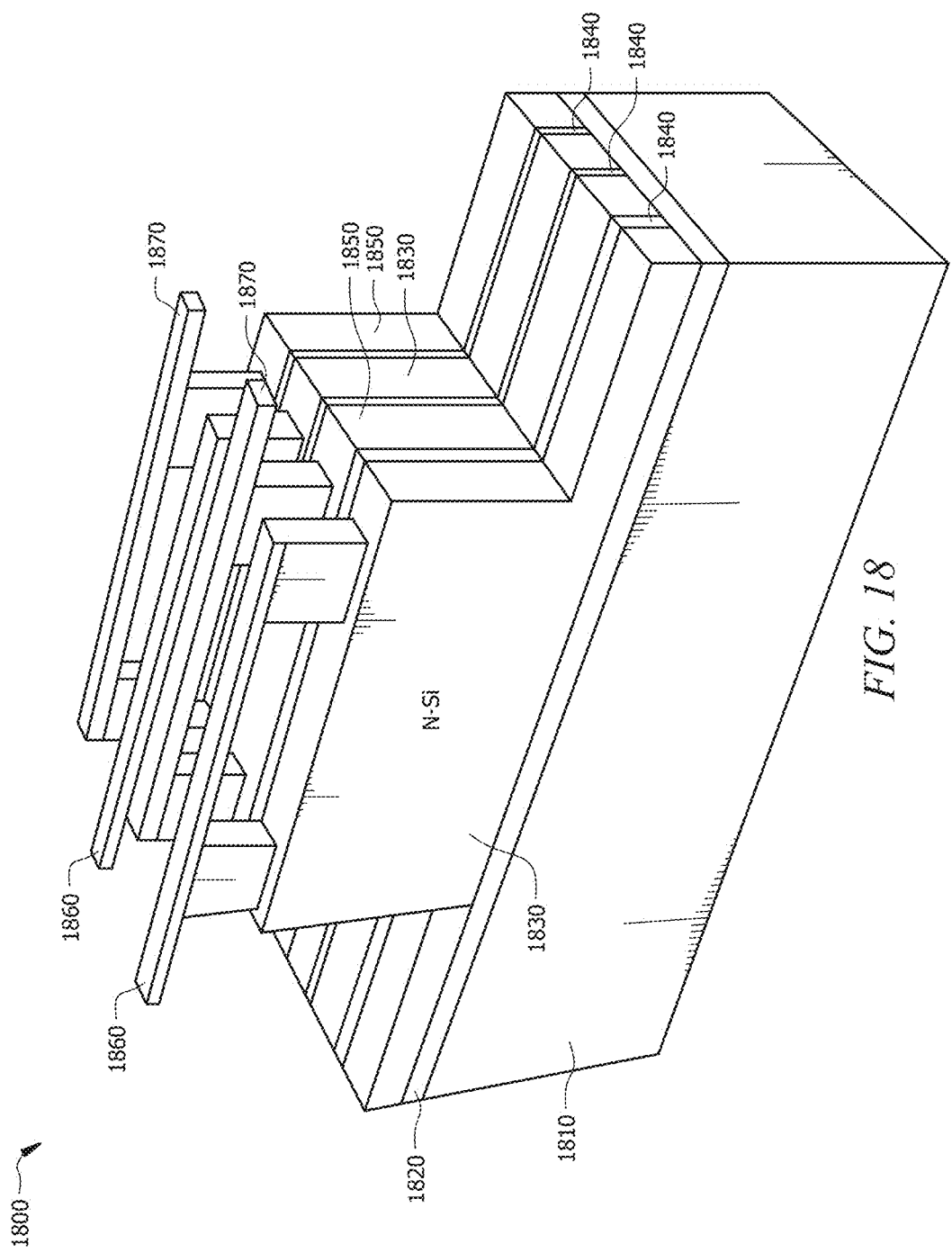
FIG. 18 is a schematic diagram of a silicon optical modulator according to yet another embodiment of the disclosure.

FIG. 18 is a schematic diagram of a silicon optical modulator 1800 according to yet another embodiment of the disclosure. The modulator 1800 comprises a silicon substrate 1810, a BOX layer 1820, two n-Si slabs 1830, three gate oxide layers 1840, two p-Si slabs 1850, two cathodes 1860, and two anodes 1870. Components similar to those in the modulators 600, 1200 are not explicitly shown, though they may be present. The components may be arranged as shown or in any other suitable manner.

The silicon substrate 1810, the BOX layer 1820, the n-Si slabs 1830, the gate oxide layers 1840, the p-Si slabs 1850, the cathodes 1860, and the anodes 1870 are similar to the silicon substrate 610, 1210, the BOX layer 620, 1220, the n-Si slabs 630, 1230, the gate oxide layers 640, the p-Si slabs 650, 1250, the anodes 660, 1260, and the cathodes 670, 1270, respectively. Unlike the modulator 600, which comprises one anode 660 coupled to the first surfaces 699 of the p-Si slabs 650 and one cathode 670 coupled to the second surfaces 697 of the n-Si slabs 630, and unlike the modulator 1200, which is similar to the modulator 600, the modulator 1700 comprises two cathodes 1860 coupled to the top of the n-Si slabs 1830 and two anodes 1870 coupled to the top of the p-Si slabs 1850. The additional cathode 1860 and anode 1870 may provide for additional levels of modulation.

Figure 19:
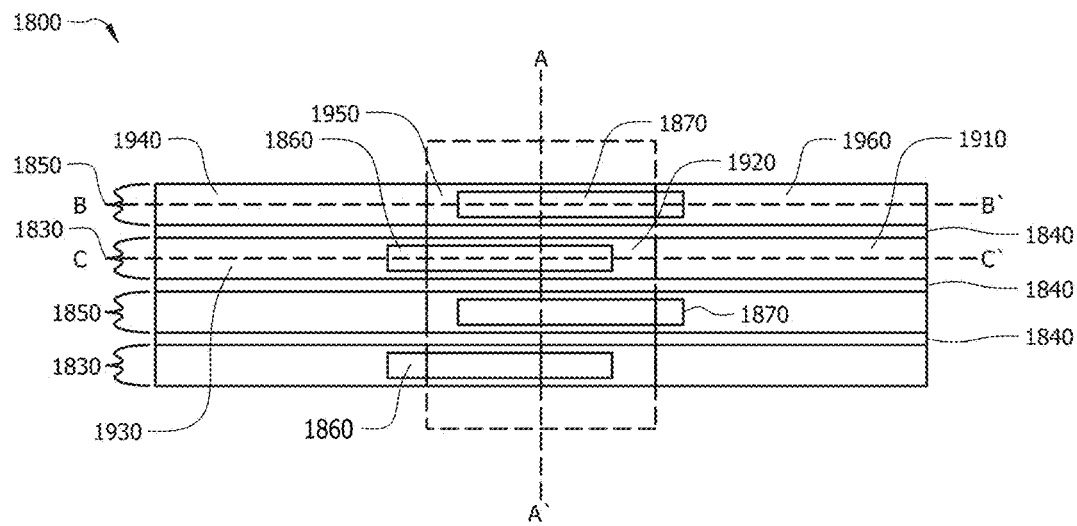
FIG. 19 is a top view of the silicon optical modulator 1800 in FIG. 18.

FIG. 19 is a top view of the silicon optical modulator 1800 in FIG. 18. Unlike FIG. 18, FIG. 19 shows different doping profiles in the n-Si slabs 1830 and in the p-Si slabs 1850. Specifically, the n-Si slabs 1830 comprise an n+ portion 1910, an n portion 1920, and a first variably-doped portion 1930, which are similar to the n+ portions 720, 1234, the n portions 730, 1236, and the first variably-doped portion 740, respectively. However, unlike in the modulators 600, 1200, the n-Si slabs 1830 in the modulator 1800 do not comprise n++ portions. Like for the modulators 600, 1200, the first variably-doped portion 1930 may be physically omitted.

Similarly, the p-Si slabs 1850 comprise a p+ portion 1940, a p portion 1950, and a second variably-doped portion 1960, which are similar to the p+ portions 760, 1254, the p portions 770, 1256, and the second variably-doped portion 780, respectively. However, unlike in the modulators 600, 1200, the p-Si slabs 1850 in the modulator 1800 do not comprise p++ portions Like for the modulators 600, 1200, the second variably-doped portion 1960 may be physically omitted.

Figure 20:
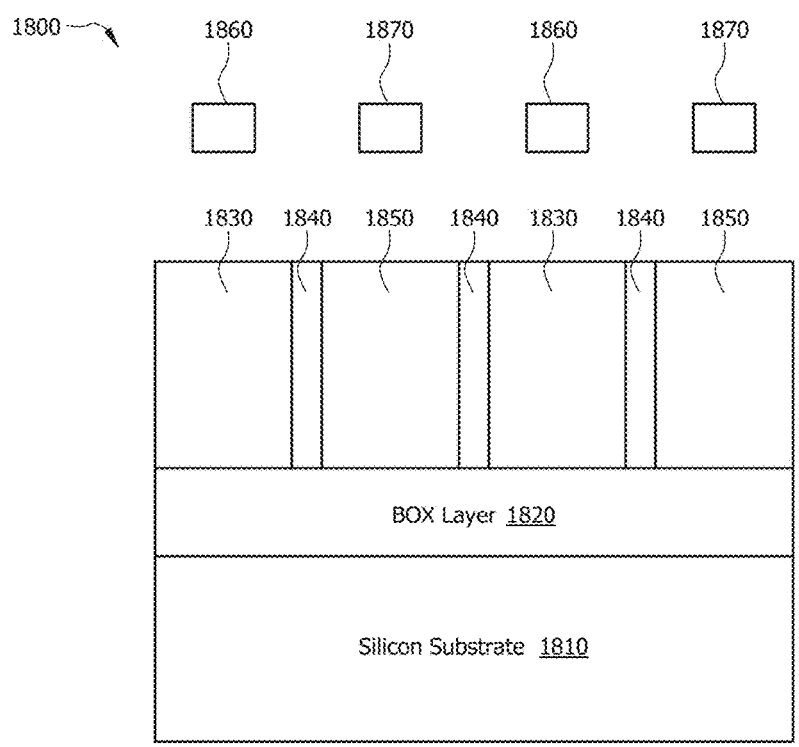
FIG. 20 is a cross-sectional view of the silicon optical modulator taken along the A-A' cutline in FIG. 19.

FIG. 20 is a cross-sectional view of the silicon optical modulator 1800 taken along the A-A' cutline in FIG. 19. FIG. 20 highlights the interdigitated nature of the n-Si slabs 1830, the gate oxide layers 1840, and the p-Si slabs 1850, as well as the positions of the cathodes 1860 and the anodes 1870. As can be seen, unlike the modulator 600 in which the anode 660 is coupled to the first surfaces 699 of the p-Si slabs 650 and the cathode 670 is coupled to the second surfaces 697 of the n-Si slabs 630, and unlike the modulator 1200, which is similar to the modulator 600, in the modulator 1800 the cathodes 1860 are on top of the n-Si slabs 1830 and the anodes 1870 are on top of the p-Si slabs 1850.

Figure 21:
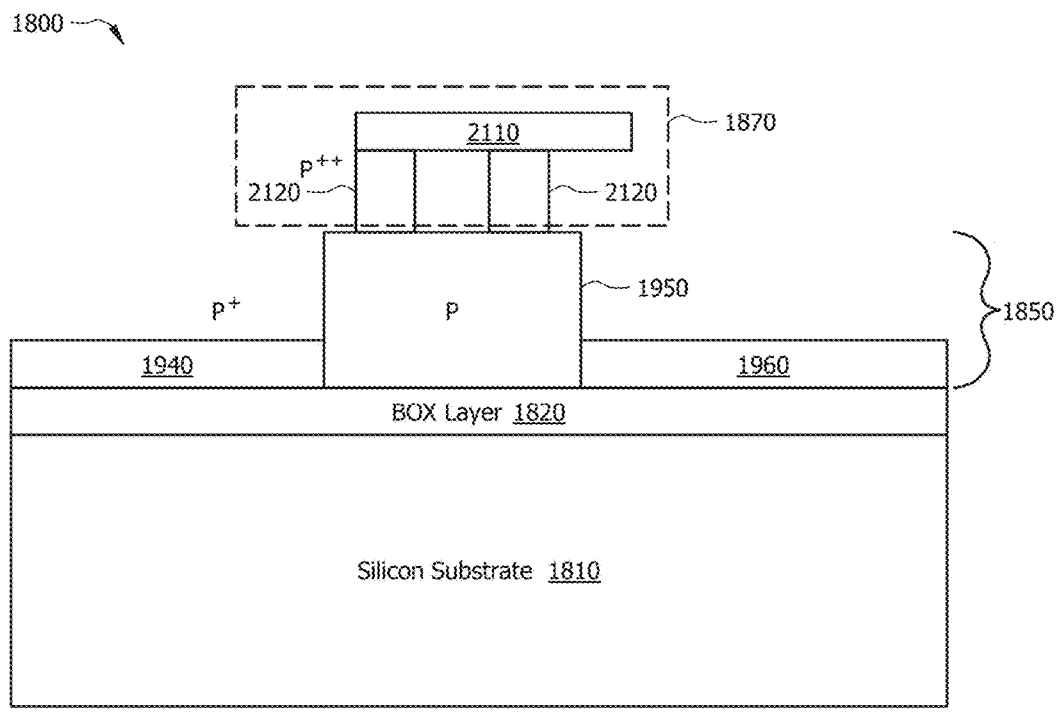
FIG. 21 is another cross-sectional view of the silicon optical modulator taken along the B-B' cutline in FIG. 19.

FIG. 21 is another cross-sectional view of the silicon optical modulator 1800 taken along the B-B' cutline in FIG. 19. FIG. 21 highlights the configuration of the p-Si slabs 1850 and the anode 1870. As can be seen, unlike the modulators 600, 1200 in which the anodes 660, 1260 are completely or primarily metal, in the modulator 1800 the anode 1870 comprises a first metal plate 2110 coupled to two first silicon legs 2120. The first metal plate 2110 comprises Ta, Co, Ni, Mo, W, Ti, Cu, Al, or any other materials suitable for conduction. The first silicon legs 2120 are heavily-doped p-Si ribs and functionally similar to the $p^{++}$ portions 750, 1252.

Figure 22:
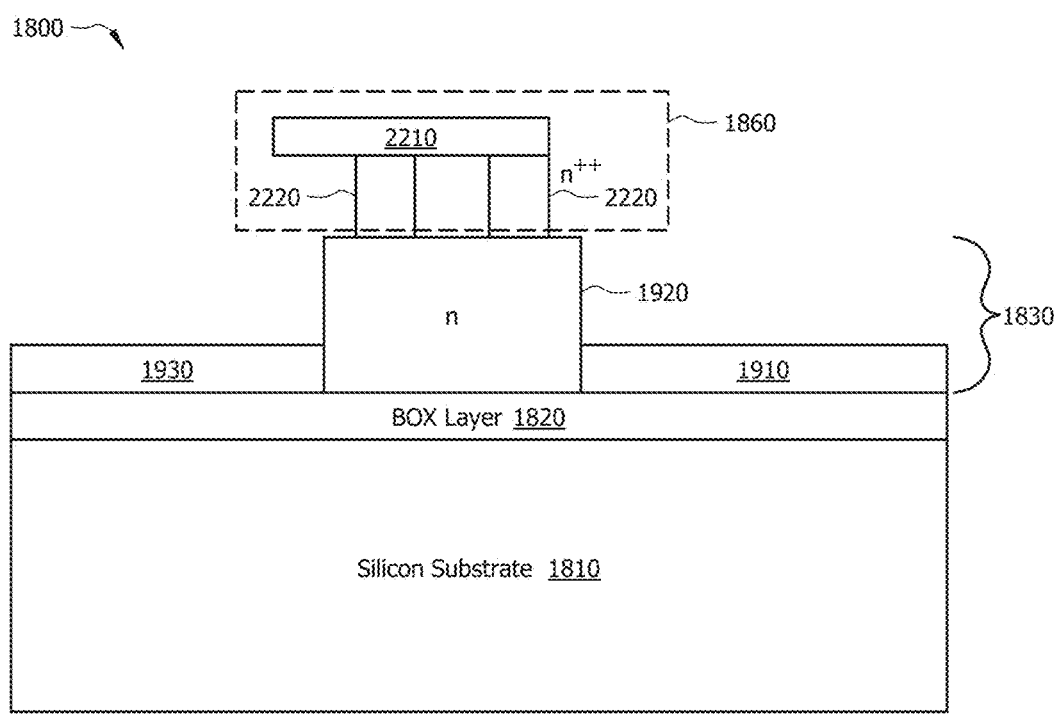
FIG. 22 is yet another cross-sectional view of the silicon optical modulator taken along the C-C' cutline in FIG. 19.

FIG. 22 is yet another cross-sectional view of the silicon optical modulator 1800 taken along the C-C' cutline in FIG. 19. FIG. 22 highlights the configuration of the n-Si slabs 1830 and the cathode 1860. As can be seen, unlike the modulators 600, 1200 in which the cathodes 670, 1270 are completely or primarily metal, in the modulator 1800 the cathode 1860 comprises a second metal plate 2210 coupled to two second silicon legs 2220. The second metal plate 2210 is similar to the first metal plate 2110, and the second silicon legs 2220 are heavily-doped n-Si ribs and functionally similar to the $n^{++}$ portions 710, 1232.

The modulator 1800 may be fabricated following the steps for fabricating the modulators 600, 1200 as described above. In addition, first, oxide is deposited on top of a ridge waveguide, and the holes are processed in the oxide via lithography and dry etching. Second, a second polysilicon layer is deposited to fill up the holes. Third, the polysilicon layers are doped via implantation. Fourth, interlayer dielectric deposition (ILD) is applied. Fifth, the anodes and the cathodes are formed and patterned.

Figure 23:
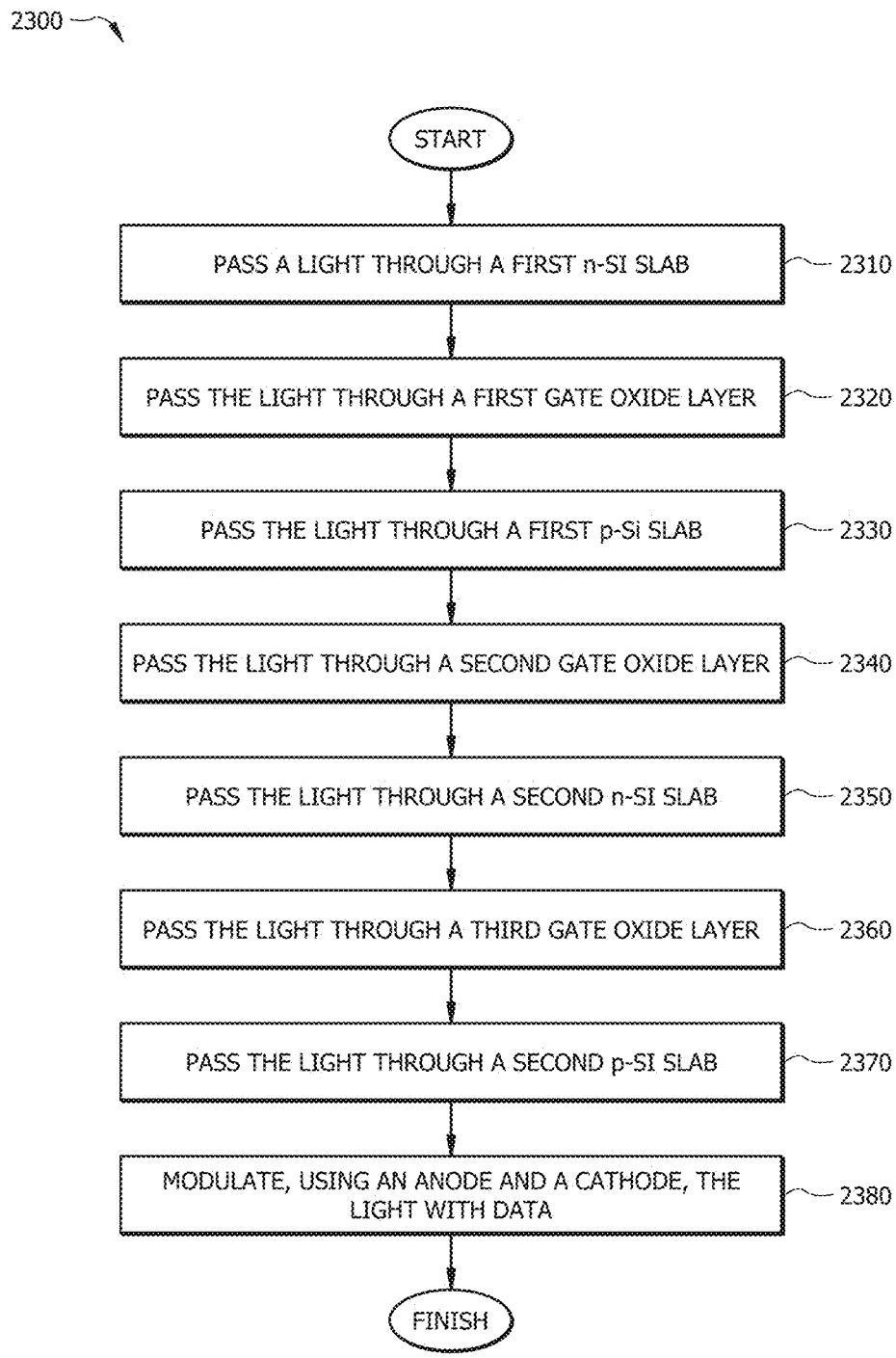
FIG. 23 is a flowchart illustrating a method of modulating light according to an embodiment of the disclosure.

FIG. 23 is a flowchart illustrating a method 2300 of modulating light according to an embodiment of the disclosure. The method may be implemented in the modulators 600, 1200, 1800. At step 2310, a light is passed through a first n-Si slab. At step 2320, the light is passed through a first gate oxide layer. At step 2330, the light is passed through a first p-Si slab. At step 2340, the light is passed through a second gate oxide layer. At step 2350, the light is passed through a second n-Si slab. At step 2360, the light is passed through a third gate oxide layer. At step 2370, the light is passed through a second p-Si slab. At step 2380, using an anode and a cathode, the light is modulated with data.

Figure 24:
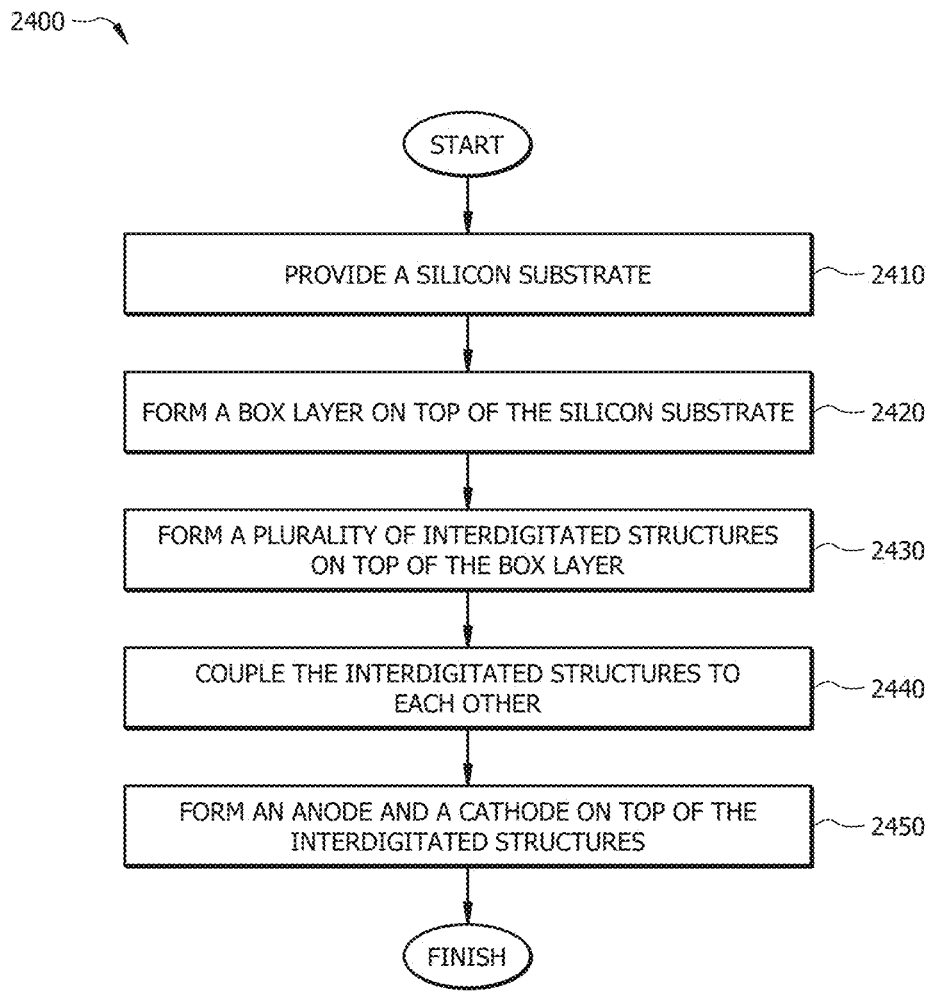
FIG. 24 is a flowchart illustrating a method of producing an optical modulator according to an embodiment of the disclosure.

FIG. 24 is a flowchart illustrating a method 2400 of producing an optical modulator according to an embodiment of the disclosure. The method 2400 may be implemented to produce the modulators 600, 1200, 1800. At step 2410, a silicon substrate is provided. At step 2420, a BOX layer is formed on top of the silicon substrate. At step 2430, a plurality of interdigitated structures is formed on top of the BOX layer. Each interdigitated structure comprises an n-Si slab, a gate oxide layer coupled to the n-Si slab, and a p-Si slab coupled to the gate oxide layer. The interdigitated structures define a light propagation path. At step 2440, the interdigitated structures are coupled to each other. At step 2450, an anode and a cathode are formed on top of the interdigitated structures.

Figure 25:
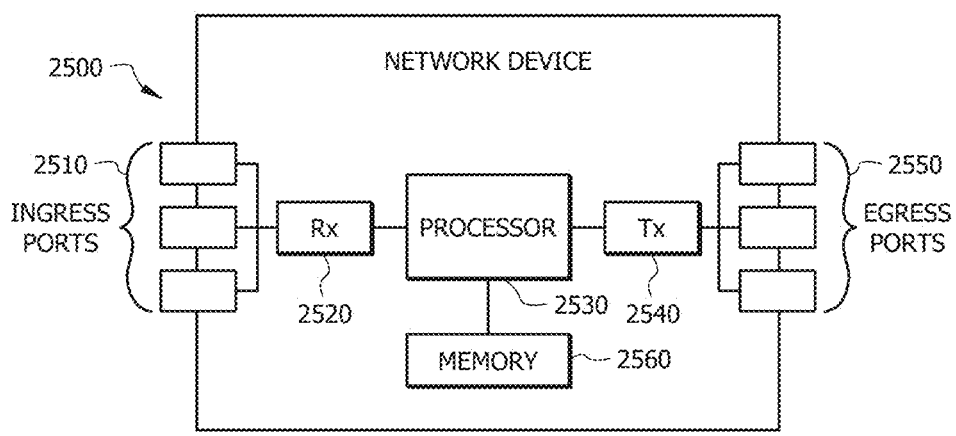
FIG. 25 is a schematic diagram of a network device.

FIG. 25 is a schematic diagram of a network device 2500. The network device 2500 may be suitable for implementing the disclosed embodiments. The network device 2500 comprises ingress ports 2510 and receiver units (Rx) 2520 for receiving data; a processor, logic unit, or central processing unit (CPU) 2530 to process the data; transmitter units (Tx) 2540; egress ports 2550 for transmitting the data; and a memory 2560 for storing the data. The network device 2500 may also comprise optical-to-electrical (OE) components and electrical-to-optical (EO) components coupled to the ingress ports 2510, receiver units 2520, transmitter units 2540, and egress ports 2550 for egress or ingress of optical or electrical signals.

The processor 2530 may be implemented by hardware and software. The processor 2530 may be implemented as one or more CPU chips, cores (e.g., as a multi-core processor), field-programmable gate arrays (FPGAs), application specific integrated circuits (ASICs), and digital signal processors (DSPs). The processor 2530 is in communication with the ingress ports 2510, receiver units 2520, transmitter units 2540, egress ports 2550, and memory 2560.

The memory 2560 comprises one or more disks, tape drives, and solid-state drives and may be used as an over flow data storage device, to store programs when such programs are selected for execution, and to store instructions and data that are read during program execution. The memory 2560 may be volatile and non-volatile and may be read-only memory (ROM), random-access memory (RAM), ternary content-addressable memory (TCAM), and static random-access memory (SRAM).

The term "about" may mean±10% of the subsequent value. While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An optical modulator comprising:
   a silicon substrate;
   a buried oxide (BOX) layer disposed on top of the silicon substrate; and
   a ridge waveguide disposed on top of the BOX layer and comprising:
   a first n-type silicon (n-Si) slab,
   a first gate oxide layer coupled to the first n-Si slab,
   a first p-type silicon (p-Si) slab coupled to the first gate oxide layer, and
   a light propagation path that travels sequentially through the first n-Si slab, the first gate oxide layer, and the first p-Si slab in a first direction,
   wherein a second direction is a vertical direction from the silicon substrate to the ridge waveguide and is orthogonal to the first direction,
   wherein a third direction is orthogonal to the first direction and the second direction, and
   wherein the first n-Si slab and the first p-Si slab vary in doping concentration across the third direction.

2. The optical modulator of claim 1, wherein the first n-Si slab, the first gate oxide layer, and the first p-Si slab form a first interdigitated structure, and wherein the ridge waveguide further comprises a second interdigitated structure comprising a second p-Si slab coupled to the first p-Si slab, a second gate oxide layer coupled to the second p-Si slab, and a second n-Si slab coupled to the second gate oxide layer.

3. The optical modulator of claim 2, further comprising:
   a cathode coupled to the first n-Si slab and the second n-Si slab; and
   an anode coupled to the first p-Si slab and the second p-Si slab.

4. The optical modulator of claim 2, further comprising:
a first cathode coupled to the first n-Si slab;
a second cathode coupled to the second n-Si slab; and
a first anode coupled to the first p-Si slab.

5. The optical modulator of claim 1, wherein the first n-Si slab comprises a first lightly-doped n portion, a first moderately-doped n portion, and a first heavily-doped n portion.

6. The optical modulator of claim 5, wherein the first n-Si slab further comprises a first variably-doped portion.

7. The optical modulator of claim 5, wherein the first lightly-doped n portion comprises a first carrier concentration of about $10^{15}$ centimeter$^{-3}$ (cm$^{-3}$) to about $5 \times 10^{18}$ cm$^{-3}$, the first moderately-doped n portion comprises a second carrier concentration of about $10^{17}$ cm$^{-3}$ to about $10^{19}$ cm$^{-3}$, and the first heavily-doped n portion comprises a third carrier concentration of about $10^{19}$ cm$^{-3}$ to about $10^{20}$ cm$^{-3}$.

8. The optical modulator of claim 1, wherein the first p-Si slab comprises a first lightly-doped p portion, a first moderately-doped p portion, and a first heavily-doped p portion.

9. The optical modulator of claim 8, wherein the first p-Si slab further comprises a second variably-doped portion.

10. The optical modulator of claim 8, wherein the first lightly-doped p portion comprises a fourth carrier concentration of $10^{15}$ cm$^{-3}$ to about $5 \times 10^{18}$ cm$^{-3}$, the first moderately-doped p portion comprises a fifth carrier concentration of $10^{17}$ cm$^{-3}$ to about $10^{19}$ cm$^{-3}$, and the first heavily-doped p portion comprises a sixth carrier concentration of $10^{19}$ cm$^{-3}$ to about $10^{20}$ cm$^{-3}$.

11. The optical modulator of claim 1, wherein the first gate oxide layer comprises hafnium aluminum oxide (HfAlO) with an aluminum percentage between about 40% and about 44%.

12. The optical modulator of claim 11, wherein a thickness of the first gate oxide layer is less than 2 nanometers (nm).

13. The optical modulator of claim 1, wherein the silicon substrate, the BOX layer, and the ridge waveguide comprise a same height with respect to the second direction.

14. A method comprising:
first, passing a light through a first n-type silicon (n-Si) slab;
second, passing the light through a first gate oxide layer coupled to the first n-Si slab;
third, passing the light through a first p-type silicon (p-Si) slab coupled to the first gate oxide layer;
fourth, passing the light through a second gate oxide layer coupled to the first p-Si slab;
fifth, passing the light through a second n-Si slab coupled to the second gate oxide layer;
sixth, passing the light through a third gate oxide layer coupled to the second n-Si slab;
seventh, passing the light through a second p-Si slab coupled to the third gate oxide layer; and
modulating the light with data using an anode coupled to the first p-Si slab and the second p-Si slab, a first cathode coupled to the first n-Si slab, and a second cathode independent of the first cathode and coupled to the second n-Si slab.

15. The method of claim 14, wherein the light passes through a first direction, wherein a second direction is a vertical direction from a silicon substrate to the first n-Si slab and is orthogonal to the first direction, wherein a third direction is orthogonal to the first direction and the second direction, and wherein the first n-Si slab and the first p-Si slab vary in doping concentration across the third direction.

16. A method comprising:
providing a silicon substrate;
forming a buried oxide (BOX) layer on top of the silicon substrate;
forming a plurality of interdigitated structures on top of the BOX layer, wherein each interdigitated structure comprises an n-type silicon (n-Si) slab, a gate oxide layer coupled to the n-Si slab, and a p-type silicon (p-Si) slab coupled to the gate oxide layer, and wherein the interdigitated structures define a light propagation path;
coupling the interdigitated structures to each other; and
forming an anode, a first cathode, and a second cathode on top of the interdigitated structures so that the anode is coupled to a first p-Si slab and a second p-Si slab, the first cathode is coupled to a first n-Si slab, and the second cathode is independent of the first cathode and coupled to a second n-Si slab.

17. The method of claim 16, wherein the n-Si slabs and the p-Si slabs comprise silicon with a first refractive index and the gate oxide layers comprise a high-K material with a second refractive index, and wherein the method further comprises matching the second refractive index to the first refractive index.

18. The method of claim 16, wherein the light propagation path is in a first direction that sequentially travels through the interdigitated structures, wherein a second direction is a vertical direction from the silicon substrate to the interdigitated structures and is orthogonal to the first direction, wherein a third direction is orthogonal to the first direction and the second direction, and wherein the n-Si slabs and the p-Si slabs vary in doping concentration across the third direction.

* * * * *